United States Patent
Yi et al.

(10) Patent No.: US 9,510,260 B2
(45) Date of Patent: Nov. 29, 2016

(54) METHOD AND APPARATUS FOR TRANSMITTING AND RECEIVING DATA IN A WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/440,035

(22) PCT Filed: Nov. 25, 2013

(86) PCT No.: PCT/KR2013/010746
§ 371 (c)(1),
(2) Date: Apr. 30, 2015

(87) PCT Pub. No.: WO2014/081262
PCT Pub. Date: May 30, 2014

(65) Prior Publication Data
US 2015/0282036 A1    Oct. 1, 2015

Related U.S. Application Data

(60) Provisional application No. 61/729,631, filed on Nov. 25, 2012, provisional application No. 61/740,448, filed on Dec. 20, 2012.

(51) Int. Cl.
*H04W 36/30* (2009.01)
*H04L 5/00* (2006.01)
(Continued)

(52) U.S. Cl.
CPC .............. *H04W 36/30* (2013.01); *H04L 5/001* (2013.01); *H04L 5/0035* (2013.01);
(Continued)

(58) Field of Classification Search
CPC .. H04W 36/30; H04W 74/006; H04L 5/001; H04L 5/0035; H04L 5/0048; H04L 5/0098
See application file for complete search history.

(56) References Cited

U.S. PATENT DOCUMENTS

| | | | |
|---|---|---|---|
| 2010/0215011 A1* | 8/2010 | Pan | H04L 5/0064 370/329 |
| 2010/0303039 A1* | 12/2010 | Zhang | H04L 5/0035 370/331 |

(Continued)

FOREIGN PATENT DOCUMENTS

| KR | 10-2012-0092014 | 8/2012 |
|---|---|---|
| WO | 2010/105148 | 9/2010 |

OTHER PUBLICATIONS

Huawei, "DL Radio Link Failure in CA," 3GPP TSG-RAN WG2 meeting #69, R2-101017, Feb. 2010, 5 pages.
PCT International Application No. PCT/KR2013/010746, Written Opinion of the International Searching Authority dated Feb. 14, 2014, 1 page.

*Primary Examiner* — Albert T Chou
(74) *Attorney, Agent, or Firm* — Lee, Hong, Degerman, Kang & Waimey

(57) ABSTRACT

A method for and apparatus for transmitting and receiving data in a wireless communication system supporting multiple carriers is provided. A wireless device determines that a radio link failure (RLF) or a switch trigger condition is occurred for a cell among the multiple carriers, herein the multiple carriers each is set to a cell each, reconfigures an enhanced Physical Downlink Control Channel (ePDCCH) set of the cell that the RLF or the switch trigger is occurred, and determines whether cells of the multiple carriers each is on or off according to the reconfiguring. Thus, more efficient and accurate cell planning schemes are provided to transmit between the small cells and the UE to support inter-cell interference reduction and carrier extensions.

13 Claims, 13 Drawing Sheets

(51) Int. Cl.
*H04L 5/14* (2006.01)
*H04W 74/00* (2009.01)
*H04W 24/02* (2009.01)
*H04W 88/08* (2009.01)

(52) U.S. Cl.
CPC .......... *H04L 5/0048* (2013.01); *H04L 5/0073* (2013.01); *H04L 5/0098* (2013.01); *H04L 5/1469* (2013.01); *H04W 74/006* (2013.01); *H04L 5/0089* (2013.01); *H04W 24/02* (2013.01); *H04W 88/08* (2013.01)

(56) References Cited

U.S. PATENT DOCUMENTS

| | | | |
|---|---|---|---|
| 2010/0322067 A1* | 12/2010 | Tenny | H04W 76/028 370/216 |
| 2011/0134774 A1* | 6/2011 | Pelletier | H04W 52/365 370/252 |
| 2012/0092999 A1* | 4/2012 | Chen | H04W 24/02 370/241 |
| 2012/0230232 A1 | 9/2012 | Ji et al. | |
| 2012/0282964 A1 | 11/2012 | Xiao et al. | |

* cited by examiner

METHOD AND APPARATUS FOR TRANSMITTING AND RECEIVING DATA IN A WIRELESS COMMUNICATION SYSTEM

CROSS-REFERENCE TO RELATED APPLICATIONS

This application is the National Stage filing under 35 U.S.C. 371 of International Application No. PCT/KR2013/010746, filed on Nov. 25, 2013, which claims the benefit of U.S. Provisional Application Nos. 61/729,631, filed on Nov. 25, 2012 and 61/740,448 filed on Dec. 20, 2012, the contents of which are all hereby incorporated by reference herein in their entirety.

TECHNICAL FIELD

The present invention relates to wireless communications, and more particularly, to a method and apparatus for transmitting and receiving data and control in a wireless communication system supporting multiple carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. An efficient allocation scheme for the efficient cell planning including a new carrier which is not necessarily transmitted control and reference signals is highly needed to define.

DISCLOSURE

Technical Problem

The present invention provides a method and apparatus for transmitting and receiving data and control in a wireless communication system supporting multiple carriers.

The present invention also provides a method and apparatus for scheduling cell on/off in a wireless communication system supporting multiple carriers.

The present invention also provides a method and apparatus for determining cell on/off with presence of reference signal (RS)s in a wireless communication system supporting multiple carriers.

Technical Solution

In an aspect, a method for transmitting and receiving data in a wireless communication system supporting multiple carriers is provided. The method may include determining that a radio link failure (RLF) or a switch trigger condition is occurred for a cell among the multiple carriers, herein the multiple carriers each is set to a cell each, reconfiguring an enhanced Physical Downlink Control Channel (ePDCCH) set of the cell that the RLF or the switch trigger is occurred, and determining whether cells of the multiple carriers each is on or off according to the reconfiguring.

The method may further include determining whether a channel state information reference signal (CSI-RS) resource for the ePDCCH set is activated or deactivated for the determining cell on/off, wherein the CSI-RS is associated with a Cell identification(ID) of Transmission Point.

The method may further include determining whether at least one of CSI-RS resource or CSI process or a cell associated with a PQI (PDSCH RE mapping and Qausi-collocated Indicator) index is activated or deactivated for the determining cell on/off.

In another aspect, a wireless device for transmitting and receiving data in a wireless communication system supporting multiple carriers is provided. The wireless device may include a radio frequency unit for receiving a radio signal; and a processor, operatively coupled with the radio frequency unit, configured to determine that a radio link failure (RLF) or a switch trigger condition is occurred for a cell among the multiple carriers, herein the multiple carriers each is set to a cell each, reconfigure an enhanced Physical Downlink Control Channel (ePDCCH) set of the cell that the RLF or the switch trigger is occurred, and determine whether cells of the multiple carriers each is on or off according to the reconfiguring.

In another aspect, a method for transmitting and receiving data in a wireless communication system supporting multiple carriers may further include determining whether cells of the multiple carriers each is configured with different TDD configuration or a dynamic TDD configuration, determining whether timing of the cells each to transmit or receive data and control based on the different TDD configuration or the dynamic TDD configuration for the cells each, and determining to receive or transmit response signals each based on the configurations each of corresponding to the cells each. Wherein the multiple carriers each is set with difference frequencies each and the timings are set for HARQ(Hybrid Automatic Repeat reQuest) process.

Advantageous Effects

This invention provides that an enhanced communication system having a new form carrier, the system in which all or some of the proposed backward compatible legacy signals and/or channels are not transmitted for reasons of the improvement of an interference problem between a plurality of cells and for reasons of the improvement of spectral efficiency by reducing overhead. The enhancement of carrier extensibility and an increase in the degree of freedom in providing advanced features for this invention is provided. Thus, this invention provides to improve channel estimation performance and data demodulation performance in small cell environments where small cells may be densely deployed and dynamic turning on/off of a cell may be applied. Also, more efficient and accurate cell planning schemes are provided to transmit between the small cells and the UE to support inter-cell interference reduction and carrier extensions.

MODE FOR INVENTION

Figure 1:
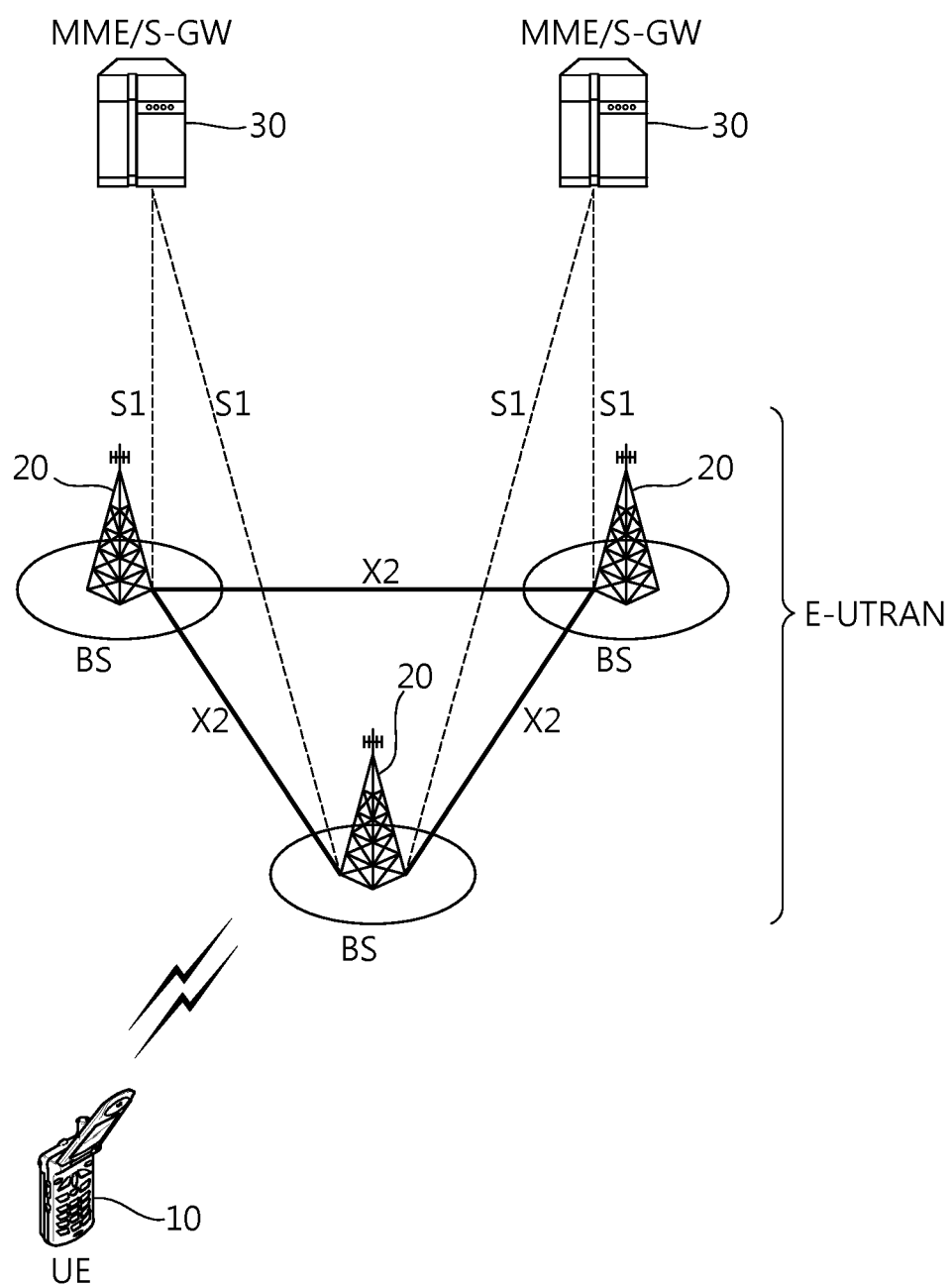
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and system information RNTI (SI-RNTI) may be masked to the CRC. To indicate a random access response that is a response for transmission of a random access preamble of the UE, a random access-RNTI (RA-RNTI) may be masked to the CRC.

Figure 2:
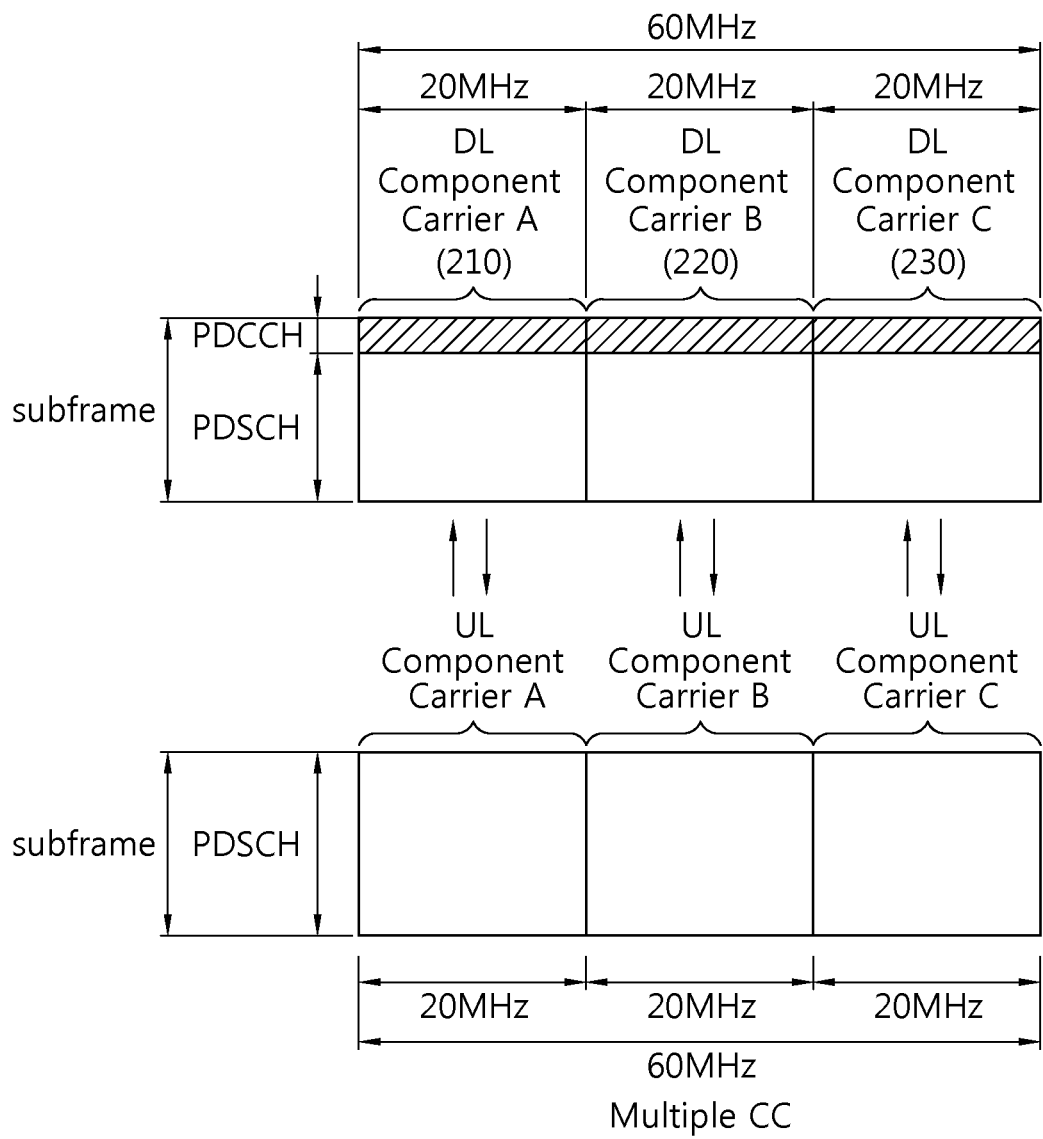
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE s monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE;'s capability thereof.

Hereinafter, a CC may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or a RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . 7 for a serving cell index 1 corresponds to a $7^{th}$ bit from the left., which are the remaining indices other than 0, i.e., the index of the Pcell. Herein, the index of the serving cell may be a logical index determined relatively for each UE, or may be a physical index for indicating a cell of a specific frequency band. And the CA system supports a non-cross carrier scheduling (self-carrier scheduling).or, cross carrier scheduling.

In LTE system, FDD DL carrier subframe or TDD DL subframe starts with a few symbols of control channels such as PDCCH, PHICH and PCFICH and use the rest symbols to transmit PDSCH. The number of OFDM symbols used for control channels can be dynamically indicated by PCFICH or semi-statically by RRC signaling to UE. That is, CRS and control channels, such as PCFICHs/PDCCHs/PHICHs over some OFDM symbol(s) of the former part, are transmitted through all DL subframes for a specific new carrier other than a DL subframe configured for a special purpose e.g., an MBSFN. Accordingly, backward compatibility for access by existing UE and for providing service to existing UE can be guaranteed. In addition to, for the next LTE system or enhanced communication system, a new form of a carrier or cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features (e.g., 8Tx MIMO).

The present invention includes that a carrier is defined as a cell with new carrier form with an optimized type to transmit a Reference Signal (RS) or control channels. The DL resources can be efficiently used by improving the performance of DL reception and minimizing RS overhead through the reception of DM-RS-based DL data transmitted in a UE-specific way (i.e., precoded) and the measurement of a channel status based on a configurable CSI-RS having relatively low density, instead of omitting or significantly reducing fixed CRS transmission having high density i.e., the reception of DL data and the measurement of a channel status dependent on the CRS transmission basically in a new cell. Accordingly, a method of performing DL data scheduling using a new cell may be taken into consideration by managing legacy RSs, that is, configured as the DL Transmission Mode (TM) of UE to which an new carrier has been allocated, in particular, only TMs (e.g., TM mode 8 or 9) based on a DM-RS, from among the above-defined DL TMs. Also, synchronization/tracking and various types of measurement may need to be performed on a new carrier for efficiency. That is, there is a need of a new carrier for an efficient cell planning since the Pcell is completely saturated with transmitting and receiving control signals and reference signals between eNB and UE, also the Pcell needs more resources to control the UE with one more Scells for CA.

Figure 3:
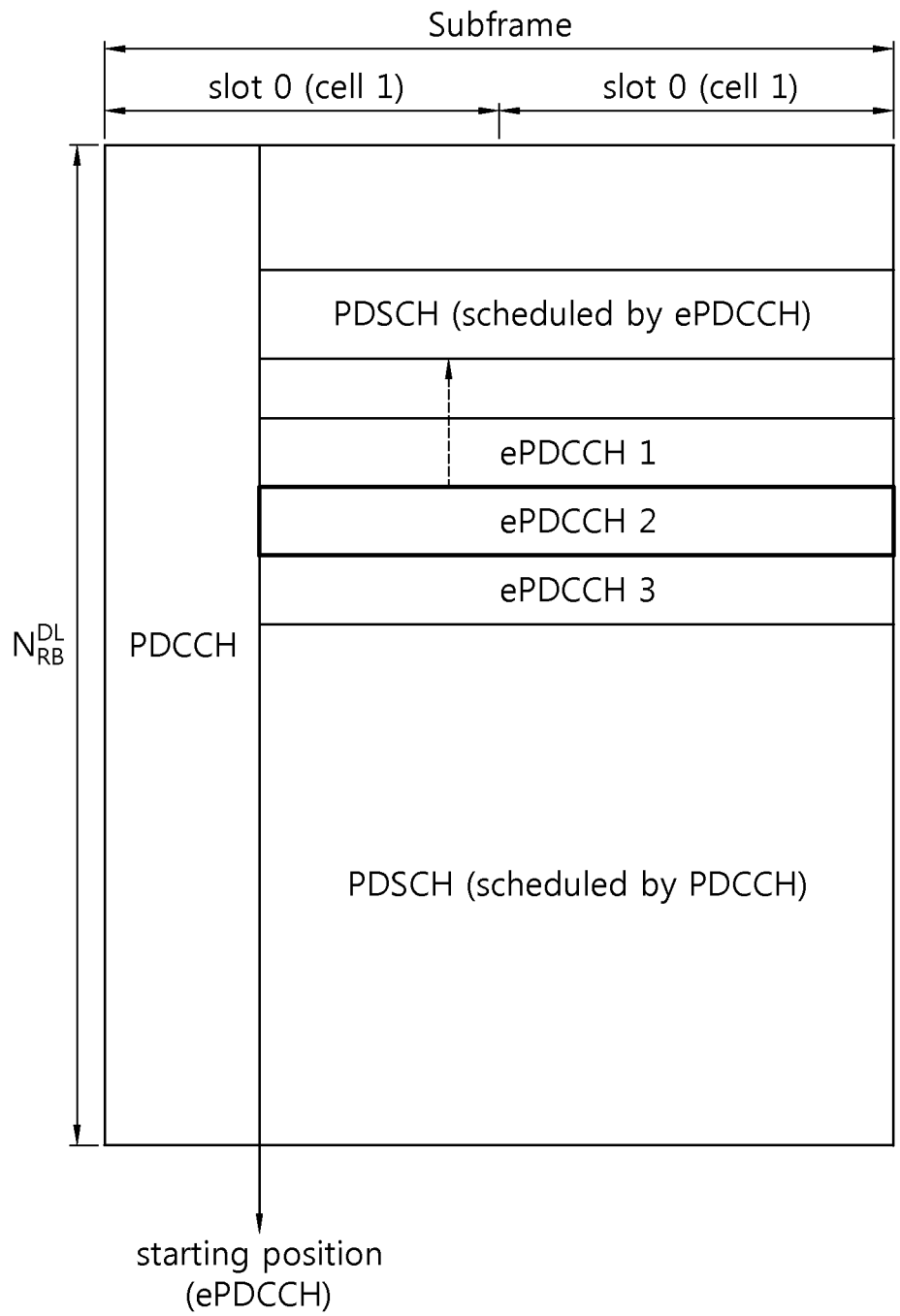
FIG. 3 shows an exemplary concept for an enhanced PDCCH (ePDCCH) which can be multiplexed with PDSCH according to an exemplary embodiment of the present invention.

An enhanced PDCCH (ePDCCH) which can be multiplexed with PDSCH can be employed as shown in FIG. 3 to support multiple Scells of the CA. The ePDCCH can be one of solutions of limitation for a PDCCH transmission or new control information transmission of near future commination system including a new type of carrier.

Referring to FIG. 3, the ePDCCH can be placed in data region which conveys control information. So, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM can be considered for new carrier type as well.

Hereafter, new carrier type refers to a carrier where all or part of legacy signals can be omitted or transmitted in different manners. For example, a new carrier may refer a carrier where CRS may be omitted in some subframes or PBCH may not be transmitted. A new carrier may not mean that Rel-11 and below UEs may not be able to access the carrier. However, it is expected that Rel-11 and below UEs may not achieve the same performance compared to legacy carrier due to a certain features lacking such as continuous CRS transmission.

The UE firstly determine the modulation order and transport block size(s) in the physical downlink shared channel by reading the 5-bit modulation and coding scheme/redundancy version field in a DCI. But a new carrier may not carry legacy PDCCH, and thus ePDCCH and PDSCH may start the first OFDM symbol in each subframe. For a new carrier, two approaches can be needed. One approach is to eliminate CRS and PDCCH entirely from transmission and thus all subframes are operated based on DM-RS and ePDCCH. Another approach is to allow occasional CRS and PDCCH transmission such that subset of subframes may carry CRS and PDCCH or may carry discovery signals and PDCCH. When CRS and PDCCH are not transmitted, it can be assumed that ePDCCH and PDSCH may start at the first OFDM symbol. Thus, the starting OFDM symbol may change subframe-by-subframe or changed semi-statically or decided implicitly based on some other signals or configurations such as restricted measurement set where restricted measurement set 0 would be assumed as carrying CRS and restricted measurement set 1 would be assumed as not carrying CRS/PDCCH and thus ePDCCH/PDSCH may start at the first OFDM symbol.

Furthermore, for an efficient operation for a dense hot spot small cell deployment, it can be further considered turning on/off cells rather dynamically or semi-statically. It can be assumed that discovery signals which may have different periodicity and/or resource from the currently existing PSS/SSS/CRS or CSI-RS can be transmitted which will be used for cell identification and/or measurement. Proposal of this invention can be applicable to the case where cell on/off is performed and then discovery signals are transmitted. It can be assumed that invention applied to TRS/CRS can be applied to discovery signals without loss of generality. TRS refers reference signals used for time/frequency tracking (tracking RS).

As described, in the new carrier, a special subframe may not have legacy PDCCH and starts PDSCH at first OFDM symbol, the number of OFDM symbols used in PDSCH in special subframe is increased to 8-11 from 7-10 in normal CP. When the number of OFDM symbols is equal to or greater than 11 which is the basis of TBS calculation in normal subframe in normal carrier, the scaling factor may be increased to 1. Furthermore, this invention proposes to use OFDM symbol 0, 1 for CSI-RS REs. The CSI-RS can be used for Radio Resource Management (RRM), fine time/frequency tracking and/or interference measurement. In small cell environments where small cells are densely deployed, the CSI-RS in current specification (LTE Rel-10/11 specification) may not be sufficient to perform those functions as there are a large number of neighbor small cells which like to use orthogonal resources. Considering a new location for DM-RS in small cells to improve the quality of channel estimation and thus improve data demodulation performance, it is likely that OFDM symbol 2, 3 in each slot would not be a good position for the CSI-RS as OFDM symbol 2, 3 may be used for a new location for DM-RS. Accordingly, new CSI-RS configurations are provided as following Table 1.

TABLE 1

| Configuration | | # of CSI-RS 1 or 2 | | # of CSI-RS 4 | | # of CSI-RS 8 | |
| --- | --- | --- | --- | --- | --- | --- | --- |
| | | (k', l') | Ns mode 2 | (k', l') | Ns mode 2 | (k', l') | Ns mode 2 |
| Frame structure Type 1 and 2 | 32 | (11, 0) | 1 | (11, 0) | 1 | (11, 0) | 1 |
| | 33 | (9, 0) | 1 | (9, 0) | 1 | (9, 0) | 1 |
| | 34 | (7, 0) | 1 | (7, 0) | 1 | (7, 0) | 1 |
| | 35 | (10, 0) | 1 | (10, 0) | 1 | | |
| | 36 | (8, 0) | 1 | (8, 0) | 1 | | |
| | 37 | (6, 0) | 1 | (6, 0) | 1 | | |
| | 38 | (5, 0) | 1 | | | | |
| | 39 | (4, 0) | 1 | | | | |
| | 40 | (3, 0) | 1 | | | | |
| | 41 | (2, 0) | 1 | | | | |
| | 42 | (1, 0) | 1 | | | | |
| | 43 | (0, 0) | 1 | | | | |
| | 44 | (11, 0) | 0 | (11, 0) | 0 | (11, 0) | 0 |
| | 45 | (9, 0) | 0 | (9, 0) | 0 | (9, 0) | 0 |
| | 46 | (7, 0) | 0 | (7, 0) | 0 | (7, 0) | 0 |

TABLE 1-continued

| | # of CSI-RS 1 or 2 | | # of CSI-RS 4 | | # of CSI-RS 8 | |
|---|---|---|---|---|---|---|
| Configuration | (k', l') | Ns mode 2 | (k', l') | Ns mode 2 | (k', l') | Ns mode 2 |
| 47 | (10, 0) | 0 | (10, 0) | 0 | | |
| 48 | (8, 0) | 0 | (8, 0) | 0 | | |
| 49 | (6, 0) | 0 | (6, 0) | 0 | | |
| 50 | (5, 0) | 0 | | | | |
| 51 | (4, 0) | 0 | | | | |
| 52 | (3, 0) | 0 | | | | |
| 53 | (2, 0) | 0 | | | | |
| 54 | (1, 0) | 0 | | | | |
| 55 | (0, 0) | 0 | | | | |
| 56 | (11, 5) | 1 | (11, 5) | 1 | (11, 5) | 1 |
| 57 | (7, 5) | 1 | (7, 5) | 1 | (7, 5) | 1 |
| 58 | (10, 5) | 1 | (10, 5) | 1 | (10, 5) | 1 |
| 59 | (8, 5) | 1 | (8, 5) | 1 | (8, 5) | 1 |
| 60 | (6, 5) | 1 | (6, 5) | 1 | (6, 5) | 1 |
| 61 | (11, 5) | 0 | (11, 5) | 0 | (11, 5) | 0 |
| 62 | (7, 5) | 0 | (7, 5) | 0 | (7, 5) | 0 |
| 63 | (10, 5) | 0 | (10, 5) | 0 | (10, 5) | 0 |
| 64 | (6, 5) | 0 | (6, 5) | 0 | (6, 5) | 0 |
| 65 | (5, 0) | 1 | | | | |
| 66 | (4, 0) | 1 | | | | |
| 67 | (3, 0) | 1 | | | | |
| 68 | (2, 0) | 1 | | | | |
| 69 | (1, 0) | 1 | | | | |

When these new configuration is used, it is notable that UE shall not assume to receive CSI-RS if CSI-RS and Tracking RS or CRS collide or if CSI-RS and demodulation RS collide. This invention provides that the proposed CSI-RS configurations or a subset of them can be applied to both legacy carrier and new carrier type. When it is applied to new carrier type, it can be applied to both macro and small cell environments. When it is applied to legacy carrier, it can be applied to small cell environments regardless of macro/small cell type. To support backward compatibility issue, legacy UE shall not assume any CSI-RS transmission based on the new CSI-RS configurations. For Rel-12 and beyond UEs, it may cancel PDSCH (for other UEs or to itself) first and then decode CSI-RS. In other words, when it decodes PDSCH, it may assume that CSI-RS is transmitted per the proposed new CSI-RS configurations.

Moreover, the new location of CSI-RS may be used with existing location at the same time with the same CSI-RS configuration index. For example, with CSI-RS configuration index 0, the existing pattern with a new pattern e.g., CSI-RS location proposed in index 32 in the above table can be used simultaneously. Furthermore, this combined pattern e.g., CSI-RS configuration index 0+configuration index 32 would be useful to define interference measurement resource (IMR) or zero-power CSI-RS resource. When it is used, additional signaling or indication can be used in PQI to select one resource out of two resources. For example, a new field in PQI table e.g., IMR resource indicator is set to 1, the first configuration i.e., index 0 is selected and if it is set to 0, the second configuration i.e., index 32 is selected. The benefit of this approach is to allow more flexible usage of IMR.

Alternatively, two CSI-RS configurations may be used simultaneously. This would be efficient in particular when CSI-RS is used for discovery signals or measurement signals.

A CSI-RS Transmission over sub-band can be explained in this invention. In small cell environments, it is expected that each small cell may have large system bandwidth e.g., 100 Mhz which can be partitioned to multiple system bandwidths such as 5×20 Mhz or 10×10 Mhz depending on user profile and deployment scenarios. When multiple small cells are collaborating each other to support a UE (e.g., multiple small cells form a small-cell cluster), it is likely that the overlapped portion of bandwidth would be different. For example, Cell 1 and Cell 2 are serving a UE where the bandwidth of Cell 1 is 20 Mhz and Cell 2 is 10 Mhz and the overlapped portion would be 10 Mhz of Cell 2. When Cell 1 and Cell 2 configure interference measurement resources to the UE, Cell 1 would like to configure only 10 Mhz of CSI-RS to the UE. This will help the cases for irregular system bandwidth such as 1 Mhz, 2 Mhz as well where the system bandwidth of the cell may be informed to the UE as of 1.4 Mhz and 3 Mhz respectively where CSI-RS is propagated only within 1 Mhz and 2 Mhz range respectively.

As proposed in related invention, this invention proposes to use a CSI-RS subband configuration with starting and end RB index {start_RB, end_RB} where the UE assumes that the whole system bandwidth will carry CSI-RS unless it is configured with a separate {start_RB, end_RB} for the CSI-RS configuration. When a UE is configured with {start_RB, end_RB}, the mapping changes as to the following Math Figure as equation 1.

[Math Figure 1]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

-continued $$l = l' +$$

$$\begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = \text{start\_RB}, \ldots, \text{end\_RB}$$

$$m' = m + \left\lfloor \frac{N_{RB}^{max,DL} - N_{RB}^{DL}}{2} \right\rfloor$$

Where if an offset value is configured, m=start_RB+offset, . . . , end_RB+offset as well. A UE may be configured with multiple CSI-RS configurations where two configurations may be different only from the {start_RB, end_RB} perspective. In other words, the same CSI-RS resource is used in different sub-bands. When a subband is configured for CSI-RS transmission, all CSI (such as subband reporting) is based on the number of PRBs calculated by (end_RB−start_RB)+1 which replaces $N_{RB}^{DL}$ in CSI-related functions. For example, the number of subband S is defined as N=⌈(end_RB−start_RB+1/k⌉.

This invention notes that a set of sub-band CSI-RS resources can be configured with the same CSI process index to a UE. When it reports a CSI report, it uses all the CSI-RS within the configured sub-bands. Or, different sub-band with the same CSI-RS resource may form different CSI processes such that a UE reports separate CSI per each sub-band. Also note that {start_RB, end_RB} parameter if given can be used for other RS bandwidth and data RBs as well. In other words, when a UE is configured with {start_RB, end_RB}, it may assume that any data/RS are transmitted over [start_RB, end_RB] out of the full system bandwidth.

Furthermore, a CSI-RS configuration may come with a bitmap where the size of bitmap is the system bandwidth in # of RBs (e.g., 100 for 20 Mhz system bandwidth). Each bitmap indicates whether CSI-RS will be present in that RB or not. If CSI-RS configuration is for a sub-band, the size of bitmap can be reduced to the size of sub-band. Alternatively, PRB bundling may be used where only one RB (or two RBs) for each PRB bundle carries CSI-RS where the CSI-RS carrying RB is the lowest RB or the highest RB. Those RBs which do not carry CSI-RS for the configured cell may be used for measuring interference.

Figure 4:
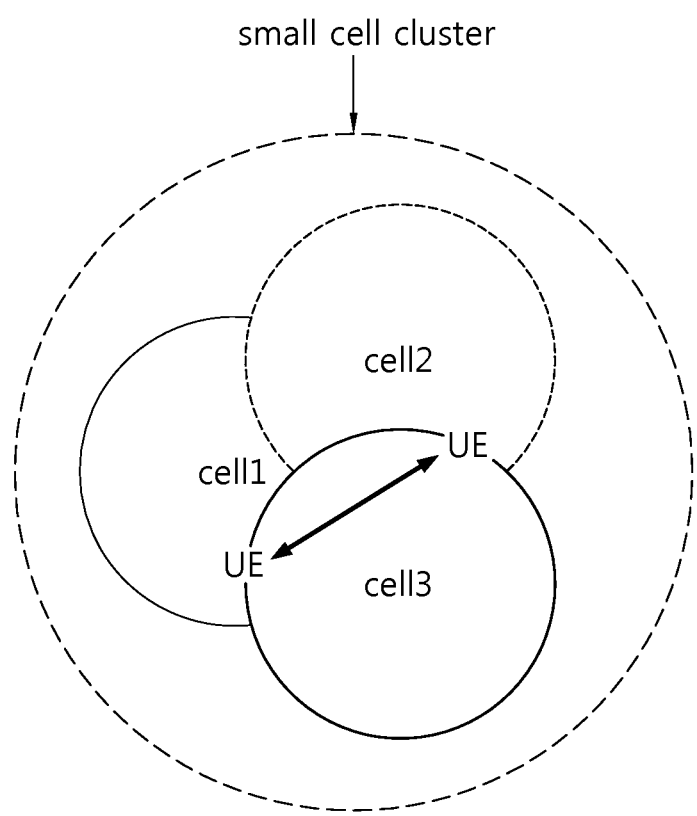
FIG. 4 illustrates scenarios of small cell cluster using CoMP environment to which the present invention is applied.

FIG. 4 illustrates scenarios of a small cell cluster using CoMP environment to which the present invention is applied.

Referring to FIG. 4, a UE with low mobility such as a user inside the building moving within a same floor is considered, it is likely that one small cell may not cover the UE entirely. But a few small cells formed a cluster which may cover the UE. For example, the UE moves around within Cell 1 ↔ Cell 3 ↔ Cell 2 as shown in FIG. 4, it would be desirable not to incur any hand-over among cells particularly when the UE moves around those cells frequently such as UE moves around the same floor continuously.

Techniques such as forming a cluster, tight coordination among small cells, smooth/soft hand-over would be useful in this scenario. This invention particularly focuses on CoMP technique where cells within a cluster collaborate with each other to seamlessly support the UE. Different from existing CoMP assumptions, cells within a small cell cluster would turn on or off its power, or transmission to save energy and mitigate inter-cell interference. Moreover, from a UE perspective, it is not assumed that all cells within a cluster are reachable all the time. It is highly likely that only a subset of cells is accessible from the UE perspective at any given time. Based on CoMP technique where each TP (transmission point) is differentiated based on non-zero-power CSI-RS resource, this invention further relaxes the assumptions of CoMP set and discusses necessary extensions.

First, a small cell within a cluster may have different system bandwidth, duplex mode (FDD or TDD), frequency, uplink resource (e.g., PUCCH offset), etc. In CoMP, there are two main configurations to define a TP within a CoMP set in thin invention.

The CoMP set includes (1) neighbour cell information including cell ID, which is for CRS related parameters, (2) PQI (PDSCH Rate Matching Quasi-collocation Index) table including TP's CSI-RS resource, MBSFN subframe configuration, CRS related information, and QCL-ed CRS information, etc.

If a TP is mapped to a non-zero-power CSI-RS resource, it is easily assumed that one of cell from (1) configurations and one entry from (2) configurations can be mapped to a TP. Extending the concept to apply some relaxation of CoMP set, following three approaches are feasible in this invention. The CoMP set can be defined a new set to include a set of parameters are not covered by neighbour cell list or PQI table. Also the CoMP set can be expanded the set of neighbour list to include CSI-RS resource and the necessary parameters or expanded PQI table to include the necessary parameters.

To support flexible change of the serving cell, this invention proposes to configure an index by higher-layer, for example, an index to PQI table can be configured if the expanded PQI table to include the necessary parameters is used. Or an index to PQI/neighbour list can be configured if the new set to include a set of parameters are not covered by neighbour cell list or PQI table or the expanded set of neighbour list to include CSI-RS resource and the necessary parameters is used.

Assuming the approach of the expanding PQI table is used, to change the set of activated TPs/Cells, eNB may reconfigure the subset of active PQI table entries. If PQI table is used for a set of small cells where each PQI entry is mapped to a small cell, PQI table entry may have to be redefined as below.

Specified fields for signal of change of the serving cell can be included as following. Cell information which the UE can assume Quasi-collocated with the CSI-RS defined in this entry including cell ID is to be included. CRS Port #, Vshift, MBSFN subframe configuration, ZP CSI-RS, PDSCH starting symbol, or NZP CSI-RS respectively, can be included in this invention. Further this invention proposes to add parameters newly by including System Bandwidth, Number of DM-RS ports (optional if different number of DM-RS ports are used within a cluster), CP Length (optional if different CP lengths are supported among cells within a cluster), SIB-linked uplink information (e.g., PUCCH information, etc) or duplex mode (FDD or TDD) (optional if different duplex mode is used within a cluster), One or more associated ePDCCH sets are optional if ePDCCH is used, A set of subframes where the UE may assume control channel and/or data channel comes from this TP (or small cell). If ePDCCH is configured, the configured set of subframes for the TP may be assumed to be subframes which carry ePDCCH (i.e., ePDCCH monitoring subframes for this TP=the set of subframes configured for this TP). If multiple ePDCCH sets are configured, one set of subframes apply to all ePDCCH sets or individual set may be configured per each EPDCCH set. Here, if the configured cell is TDD cell, this list may include the set of usable uplink subframes as well. If TDD is used, a separate parameter of TDD configuration for uplink and downlink respectively may be given. If FDD is used, the uplink timing is determined by downlink timing (i.e., by scheduling, uplink timing is determined). The one of new or legacy fields can be included in the signal of change of the serving cell.

If approach of expansion of CSI-RS resource is used, it is assumed that a UE is pre-configured with a set of CSI-RS resources where each CSI-RS is mapped to a TP (or a cell). It is noted that one or more CSI-RS resources can be mapped to a TP (or a cell) and indicates a subset of CSI-RS resources as active resources to a UE where only TPs (or cells) covered by the activated CSI-RS resources are considered as active cells. To change the set of activated TPs (or cells), eNB may reconfigure the subset of active CSI-RS resources. Regardless of which option used, it is assumed that each TP/cell have one or more different CSI-RS resource configured.

Hereinafter, this invention provides a small cell cluster including serving cell change, an example is shown how CoMP technique is utilized for a small cell cluster based on approach of expansion of PQI table.

Figure 5:
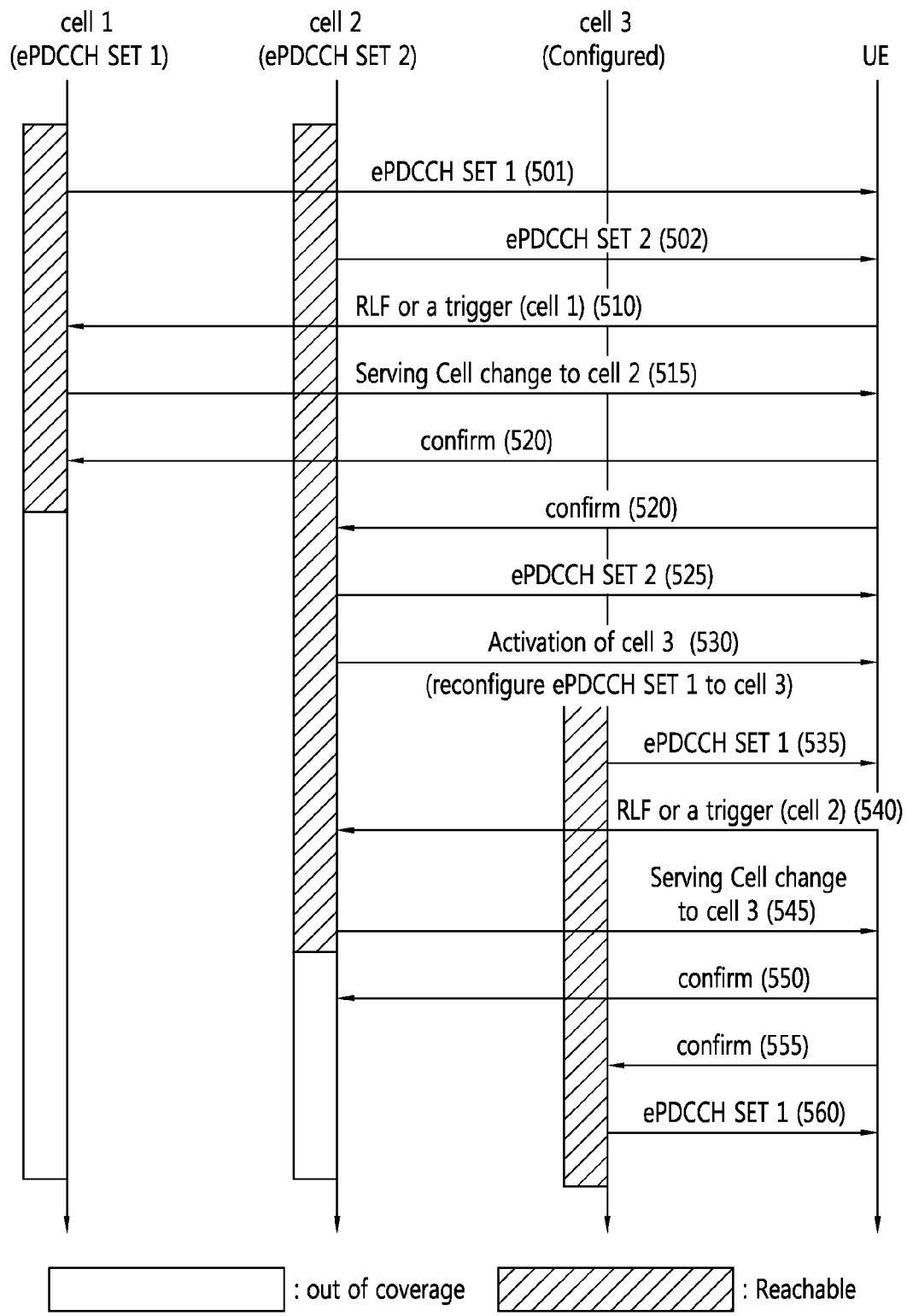
FIG. 5 shows an exemplary concept for configuration of multiple CSI-RS resources Activation/Deactivation according to an exemplary embodiment of the present invention.

FIG. 5 shows an exemplary concept for configuration of multiple CSI-RS resources Activation/Deactivation according to an exemplary embodiment of the present invention.

Referring to FIG. 5, if three small cells for a cluster are existed as CC1, CC2, and CC3, then two ePDCCH sets may be mapped to two small cells for CC1 and CC2 respectively. And each ePDCCH set may dynamically change and the small cell transmits data using PQI or ePDCCH set, the data comes from the same or each serving cell. This invention also includes that the number of ePDCCH set may be increased more than two if needed. If that occurs, the number of concurrent small cells active i.e., connected to the UE can be further increased. As the UE is served by two small cells, hand-over procedure for the UE may be changed as follows.

When a RLF or a switch trigger condition occurs for a cell which is transmitting at least control channel such as ePDCCH, reconfiguration of ePDCCH set can be necessary. The reconfiguration of ePDCCH set can be done by deactivating the CSI-RS resource or CSI process or small cell associated with the current PQI or CSI-RS resource mapped to the ePDCCH set or the transmission point on RLF occurs. When the occurred RLF is for the serving cell, serving cell change can be followed.

If there are activated cells or TPs which are not currently mapped to any ePDCCH set, reconfigure the ePDCCH set to associated with an activated cell/TP which are not currently configured to any ePDCCH set. Change the PQI index where the ePDCCH set is mapped which defines the change of transmission point, necessary ePDCCH re-configuration such as starting symbol can be configured in this invention. The invention also provides to activate the CSI-RS resource or CSI process or a small cell associated with the newly mapped PQI to the reconfigured ePDCCH set.

The invention provides that UE may communicate directly with a new serving cell (e.g., Cell 2 in the example) instead of communicating with previous serving cell as it may not reachable by transmitting serving cell request described later when the RLF occurs. When a new serving cell receives the request, it may communicate the RLF or serving cell request information via backhaul interfaces with the previous serving cell so that a proper hand-over procedure can be initiated. When RLF occurs and UE initiates a hand-over procedure, once it transmits RLF, regardless of serving cell deactivation of the associated CSI-RS resource, the UE shall deactivate the associated CSI-RS resource (or CSI process or TP or cell). Thus, it will not expect any downlink data (i.e., no BD on ePDCCH set for the serving cell). Moreover, when the UE detects or predicts that a RLF on the serving cell is in a near future, it may initiate the hand-over procedure even before actual RLF occurs. That is, the UE may prepare the hand-over procedure with predicting a RLF possibility even though the actual RLF does not occur yet.

The UE behaviour is described in detail when CSI-RS resource (or the associated small cell/TP) is deactivated or activated. Furthermore, the serving cell change procedure is described more. As above description, the UE receives an ePDCCH set1 for Cell 1 and ePDCCH set2 for Cell 2 each as 501, 502, the UE detects RLF or a switch trigger of cell 1 and reports RLF or the trigger of cell to the Cell 1(510). Herein the Cell 1 is considered as a master cell or Pcell as an example, the Cell 1 precedes a serving cell change to Cell 2 with the UE (515), and the UE confirms the serving cell change (520). The Cell 2 transmits the ePDCCH set2 for the Cell 2 to the UE so that the UE reconfigures ePDCCH sets (525). The Cell 2 indicates activation of Cell 3 and reconfigures ePDCCH set 1 to Cell 3 to the UE, herein the activation of Cell 3 includes MAC signals (530). And the reconfiguration ePDCCH set 1 to Cell 3 is changed or updated automatically via the MAC signal for the activation of Cell 3 without additional signal since the UE determines that the ePDCCH set 1 is possible to rearrange by the RLF of trigger of Cell 1 before.

The Cell 3 transmits the ePDCCH set1 for the Cell 3 to the UE so that the UE reconfigures ePDCCH set1 (535). If the UE detects RLF or a switch trigger of cell and reports RLF or the trigger of cell to the Cell 2 as the serving cell (540) so the Cell 2 initiates hand-over procedure to Cell 3 (545). The UE confirms serving cell change to Cell 3 and transmits the confirmation message of the serving cell change to Cell 2 and Cell 3 if needed (550, 555). So the UE determines the CSI-RS resource (or process or small cell) associated with the newly mapped PQI to the reconfigured ePDCCH set1 (560).

Figure 6:
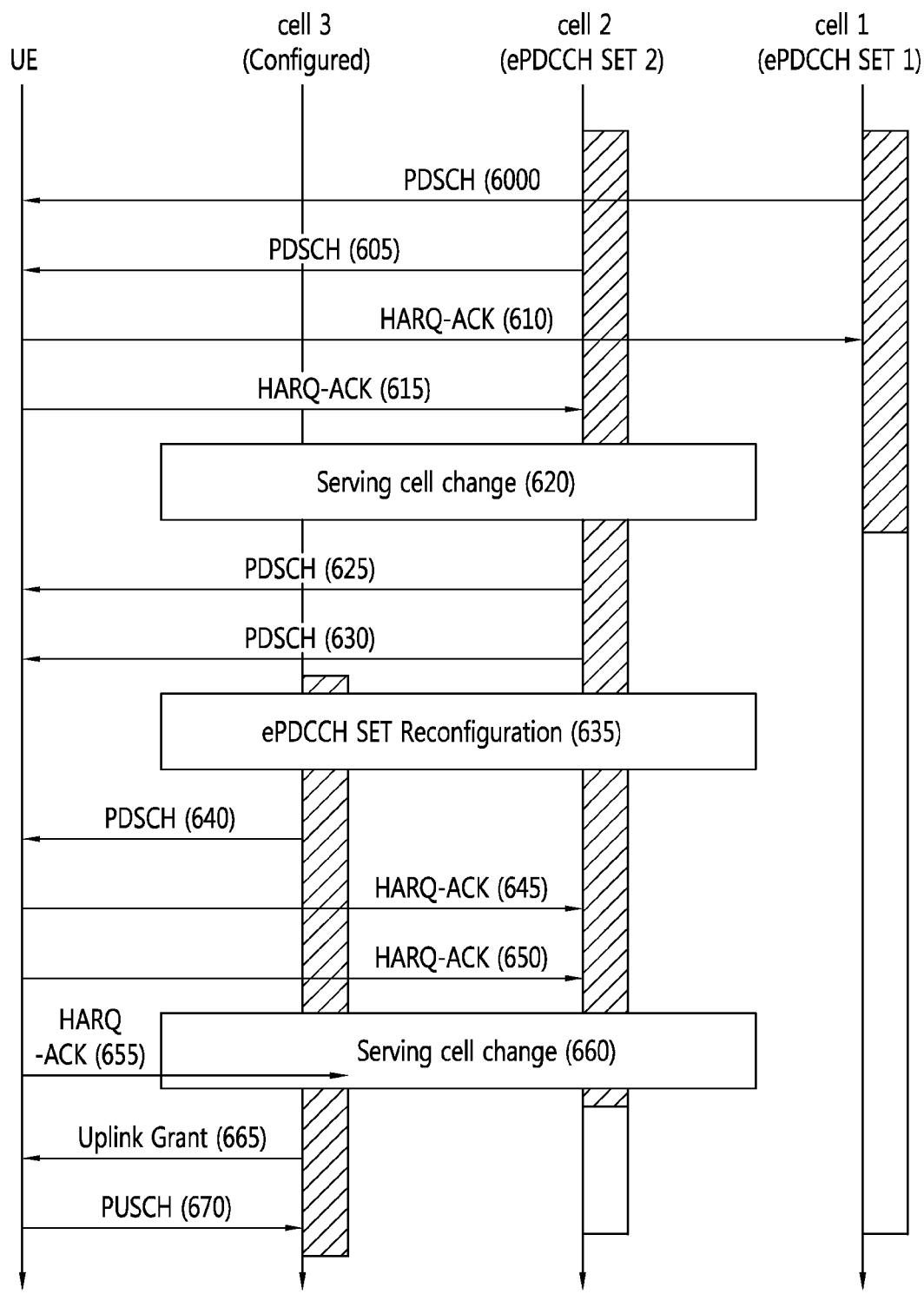
FIG. 6 shows an exemplary concept for data transmission and HARQ-ACK according to an exemplary embodiment of the present invention.

FIG. 6 shows an exemplary concept for data transmission and HARQ-ACK according to an exemplary embodiment of the present invention.

Referring to FIG. 6, for transmitting HARQ-ACK and uplink data, it is assumed that uplink CC is determined by the SIB-linked uplink of a downlink CC where control channel is received. For SPS data HARQ-ACK and transmission, it is assumed that the SIB-linked uplink of a downlink CC where SPS configuration is performed is used. It shall be assumed a separate A/N resource and individual HARQ-ACK timing per each uplink CC as shown in FIG. 6. When different ePDCCH sets are configured across multiple small cells and HARQ-ACK is configured to be transmitted per CC, it is desirable to configure a set of subframes used for each ePDCCH set respectively. Alternatively, all HARQ-ACK can be configured to be transmitted via the serving cell uplink resource. In terms of configuring a set of subframes used for each ePDCCH, the following approaches are feasible. Predefined way can be used, for example, odd subframes are used for the first ePDCCH set and even subframes are used for the second ePDCCH set. Common search space will be come from the serving cell if serving cell uses the first subframe, CSS ePDCCH will come in odd subframes. Or, other rules are also possible. For example, the first set uses non-MBSFN subframes and the second set uses MBSFN subframes.

Or, Higher-layer configuration can be used, for example, a bitmap of subframes can be configured per each ePDCCH set. Or scheduling-based scheme can be used, in any subframe, the UE may receive control/data from any ePDCCH set and the uplink is determined by the scheduled downlink or uplink grant. For SPS transmission, it follows the ePDCCH set which activates the SPS transmission. Even with scheduling-based approach, in TDD, the set of uplink subframes used for each ePDCCH set may have to be configured by higher-layer signaling.

Furthermore, the larger scale partition is also feasible such that a radio frame is assigned to a cell/TP at a time where a round-robin fashion multiplexing or configuration of radio frame sets per ePDCCH set can be applied.

This invention provides that a UE may assume that subframes not configured to either ePDCCH set or any ePDCCH set may carry legacy PDCCH or follow a behavior of fall-back, the fall-back behavior when the serving cell change occurs may follow. When each ePDCCH is transmitted from different cell or TP (inter-site TP), a subset of HARQ processes can be allocated to each ePDCCH set as well where those mapped HARQ processed will be used for the transmission from the cell. This applies to both downlink and uplink. Instead of explicit configuration of a set of HARQ processes, a UE may use the pre-defined rule such as even HARQ processes for the first ePDCCH set and odd # HARQ process index for the second ePDCCH set or 0-3 for the first ePDCCH set, 4-7 for the second ePDCCH set. When a subset of subframes are configured for each ePDCCH set, the uplink HARQ-ACK timing would follow n+4 in FDD (i.e., if n-th subframe is used for ePDCCH set1, HARQ-ACK on ePDCCH set1 will be transmitted at n+4th uplink subframe) and uplink subframes for TDD may be configured separately for each ePDCCH set or each TP or each cell or CSI-RS resource or CSI process.

As above the description, for example, the UE receives PDSCHs each for the Cell 1 and Cell 2 according to configuration of radio frame sets per ePDCCH sets such as ePDCCH set1 for Cell 1 and ePDCCH set2 for Cell 2 each can be applied (600, 605). The UE may transmit HARQ-ACK/NACK on ePDCCH set1 and HARQ-ACK/NACK on ePDCCH set2 at n+4$^{th}$ uplink subframe if nth subframe is used for ePDCCH set1 and ePDCCH set2 (610, 615). Herein the nth subframe is an example for ePDCCH set1 and ePDCCH set2, the ePDCCH set1 (nth subframe) and ePDCCH set2 (n+2$^{th}$ subframe) each configured different subframe for another example so that the HARQ-ACK/NACK timing for the ePDCCH set1 and ePDCCH set2 are set at different subframes (n+4$^{th}$, n+2+4$^{th}$) each according to the predetermined HARQ processes rule. And the HARQ processes is proceed as even HARQ processes for the ePDCCH set 1 and odd # HARQ process index for the ePDCCH set 2 or 0-3 for the ePDCCH set 1, 4-7 for the ePDCCH set 2 by the predetermined rule.

If the UE detects RLF or a switch trigger of Cell 1 and reports RLF or the trigger of Cell 1, a serving cell change to Cell 2 with the UE is performed, and the UE confirms the serving cell change (620). If ePDCCH set 1 to Cell 3 is reconfigured (635) when the UE receives PDSCHs continuously from the Cell 2 (625, 630), the UE can receive PDSCH from the Cell 3 with reconfiguring ePDCCH set 1 (640). The UE may transmit HARQ-ACK/NACK on ePDCCH set2 to Cell 2 (645, 650) and the HARQ-ACK/NACK on ePDCCH set1 to Cell 3 (655).

If the UE detects RLF or a switch trigger of Cell 2 and declares RLF or the trigger of Cell 2 so that the Cell 2 initiates hand-over procedure to Cell 3 and the UE confirms serving cell change to Cell 3 (660). The Cell 3 transmits uplink grant and the UE transmits PUSCH to Cell 3 (670).

The each HARQ-ACK/NACK resource and individual HARQ-ACK/NACK timing per each uplink CC is provided in this invention. That is, the HARQ-ACK/HACK each is configured to be transmitted via the serving cell uplink resource per CC. Herein the different ePDCCH sets each is configured across multiple small cells and each ePDCCH set respectively is set according to predetermined rule, higher layer signal, or scheduling rule.

Figure 7:
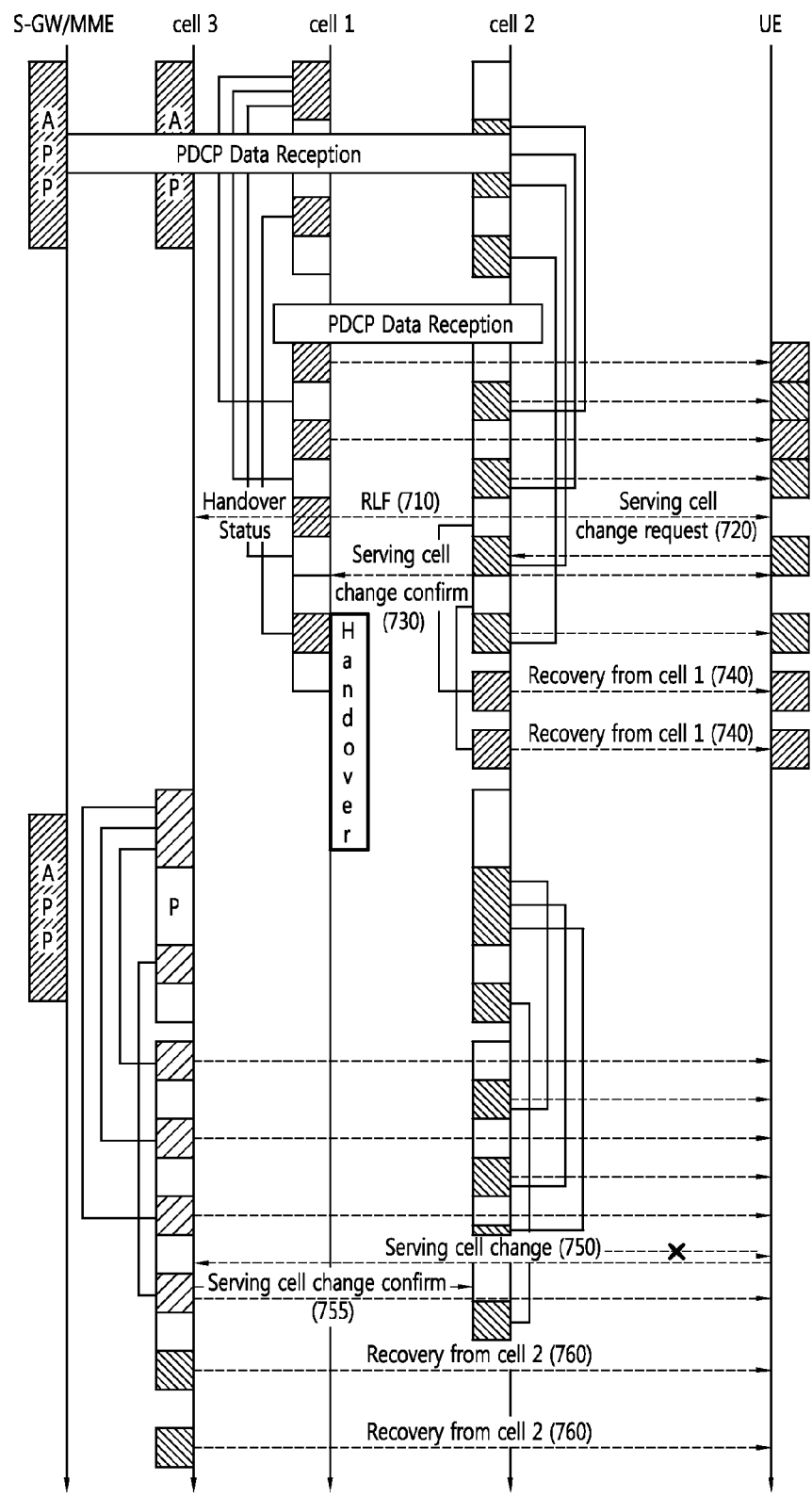
FIG. 7 shows an exemplary concept for serving cell change and data resumption according to an exemplary embodiment of the present invention.

FIG. 7 shows an exemplary concept for serving cell change and data resumption according to an exemplary embodiment of the present invention.

Referring to FIG. 7, a set of small cells are preconfigured and all configured small cells are receiving data from serving GW or MME to the UE. Based on negotiated or pre-configured configuration, each small cell which is activated divides the application data and transmits a part of application data in subframes assigned to itself.

For example, the odd subframes are used for Cell 1 and even subframes are used for Cell 2 when assuming ePDCCH sett is configured with Cell 1 and ePDCCH set2 is configured with Cell 2.

When RLF (or indication where signal strength level of Cell 1 becomes lower than a threshold) on Cell 1 occurs (710) since the UE detects that Cell 1 is not reachable by detecting RLF or detecting low quality signal.

It may request serving cell change to Cell 2 so that Cell 2 can continue data transmission including data allocated to Cell 1. The serving cell change can be transmitted via RACH, SR, PUSCH or PUCCH. When it is used for serving cell change, the request may include current serving cell information, last successful data from the current serving cell so that the new serving cell can resume the data transmission/reception. When the new serving cell receives the serving cell change request from a UE (720), it shall initiate the hand-over procedure with the previous serving cell and sends the confirmation to the previous serving cell and/or the requesting UE (730). The change request can be sent by the previous serving cell as well.

When serving cell change request occurs, the behavior at the UE and the new serving cell would be as follows.

Firstly, the UE may transmit the buffer status so that the new serving cell can resume the transmission/reception. The UE may determine that ePDCCH set associated with the previous serving cell and CSI-RS resource and/or CSI process is deactivated. The UE may determine that CSI process or CSI-RS resource or the associated PQI entry is deactivated. The UE also may flush HARQ buffers associated with HARQ processes that the previous serving cell used, e.g., if HARQ process 0, 2, 4, and 6 are allocated to ePDCCH set1 for the previous serving cell, flush HARQ buffer for HARQ process #=0, 2, 4, 6. Furthermore, the UE may initiate ePDCCH fallback mode. There are three feasible fall modes are possible. First mode can be that all subframes are used for the ePDCCH set associated with the new serving cell. Second mode can be that subframes are not used for the ePDCCH set associated with the new serving cell, UE may assume legacy PDCCH are transmitted in those subframes from the new serving cell. Third mode can be that subframes not used for ePDCCH set associated with the new serving cell will not be used for ePDCCH transmission. Thus, those can be used only for MBSFN, SPS, CSS if it is carried over PDCCH.

In contrast to, a new serving cell may communicate with serving GW on the change of serving cell, and resume data communication from the previous serving cell's last successful transmission. The HARQ processes used for the previous serving cell may not be used for the new serving cell and ePDCCH set used for the previous serving cell may not be used for the new serving cell at least for a time T unless the UE/eNB may not discover a new candidate cell to attach. Otherwise, a previous serving cell may communicate with the new serving cell on the status of buffer and other status for hand-over.

The serving cell change request may be performed that a UE or the serving cell may initiate serving cell change initiation request which initiates the process of hand-over from the serving cell to a new serving cell without actual hand-over. When this request is initiated, the target cell communicates with the serving cell to acquire data buffer, current status, UE configuration, etc to be prepared.

The reason that a UE may initiate this request is to cover a case where backhaul interface between the serving cell and a new serving cell is not present or is very slow (i.e., non-ideal) so that the latency can be large. In this case, the request by a UE can initiate active hand-over and fetch procedure if needed. For example, the serving cell may fetch the data from serving GW or MME. This request can be initiated by a threshold such as conditions (1) serving cell quality becomes lower than a threshold, (2) quality difference between a new serving cell and the current serving cell becomes larger than a threshold, that is, a new serving cell shows better quality, (3) based on UE mobility prediction, UE is about to leave the serving cell within a threshold timeframe, (4) serving cell's load becomes larger than a threshold or serving QoS quality becomes lower than a threshold, this can be indicated by the serving cell or a UE's higher layer may calculate the ratio between the achieved throughput/desired throughput or buffer status shows high back-off/delay in queue, the UE can be indicated by its higher layer. This applies to downlink and/or uplink, (5) load difference between a new serving cell and the current serving cell becomes larger than a threshold, that is a new serving cell shows lower load status, and (6) by previous serving cell's request or by a new serving cell's request.

This invention provides that the condition addressed in above, not to trigger false request, is considered as satisfactory only when the condition continues for more than a threshold time T except for the condition (6).

The serving cell change request and/or serving cell change initiation request can be sent by higher layer such as by PDCP or RLC layer. If this occurs, PHY/MAC layer sends an indication to the higher layer when the condition occurs. Alternatively, PHY/MAC layer may report a set of required metrics to higher layer which may trigger of serving cell change initiation request.

For example, this invention shows that the Cell 2 may transmit data consecutively after last successful transmission of the previous serving Cell 1 to recover data from the Cell 1 since the RLF or trigger on Cell 1 is occurred (740). The Cell 2 may also transmit data according to configuration of ePDCCH set2 for Cell 2. That is, the UE may transmit the buffer status and receive data from other configured Cell 2 for data of Cell lso that the application data can be supported continuous transmission/reception. The Cell 3 which is reconfigured by a serving cell change from Cell 1 may transmit the application data dividing from the serving GW or MME to the UE. The Cell 3 can be reconfigured with ePDCCH set1.

If the UE detects that Cell 2 is not reachable by detecting RLF or detecting low quality signal during receiving the application data from the Cell 2 and Cell 3 by using the ePDCCH set2 and the ePDCCH set1, the serving cell change request occurs (750). The serving cell change request may be performed between the UE and the Cell 3 and the new serving Cell 3 confirms to Cell 2 via hand-over process. The Cell 3 may transmit data of other Cell 2 for UE's data continuation so that the UE recover application data of Cell 2 from the Cell 3 (760).

Hereinafter, this invention provides small cell cluster with on/off period. This another example with a small cell cluster is the case where each small cell performs on/off cycles periodically or aperiodically so that the active cells from a UE perspective may change dynamically. This invention provides for assuming a tightly synchronized network among small cells within a cluster and tightly coordinated among small cells within a cluster, it is possible to allow switch a cell from one to another without changing RRC connection. This invention provides to keep the serving cell and change the PCell or TP at any given time.

More details, this invention provides to share the same cell ID among cells within a cluster: similar to CoMP scenario 4, cells may share the same cell ID. Considering a small cell cluster may be formed as a UE-specific cluster i.e., a set of cells belong to a cluster is UE-specific, this approach may still use virtual cell ID shared among cells within a cluster where virtual cell ID is an identifier to differentiate clusters.

Also, this invention provides to keep the cell ID differently among cells and use a virtual cell ID given to a cluster: when the UE is attached to a cell, it configures a virtual cell ID for the small cell cluster. Furthermore, this invention provides to keep the cell ID differently among cells and use a virtual cell ID per each cell which is used for CSI-RS resources: similar to CoMP scenario 3, another approach is to keep the cell ID intact and uses a virtual cell ID per transmission point or a cell in the cluster.

Herein the serving cell includes that a serving cell is a cell which a UE is initially connected to RRC_Connected state. The serving cell may configure a small cell cluster and collaborating cells within the cluster. Once the cluster is configured, the serving cell can be any cell within the cluster. For example, the UE initially is attached to Cell 1 to be RRC_Connected and Cell 1 configures the cluster with Cell 2/Cell 3, either Cell 2 or Cell 3 can become a serving cell when Cell 1 is off period or UE is not in Cell 1's range. This invention provides that small cells among a cluster share the same configuration; the UE is not required to be reconfigured when active cell switches from one to another.

This invention includes switch among cells within a cluster. A cell switch among cells within a cluster is performed via small cells collaboration without going through core network. In other words, RRC connected cell would not be changed from the network aspect.

Figure 8:
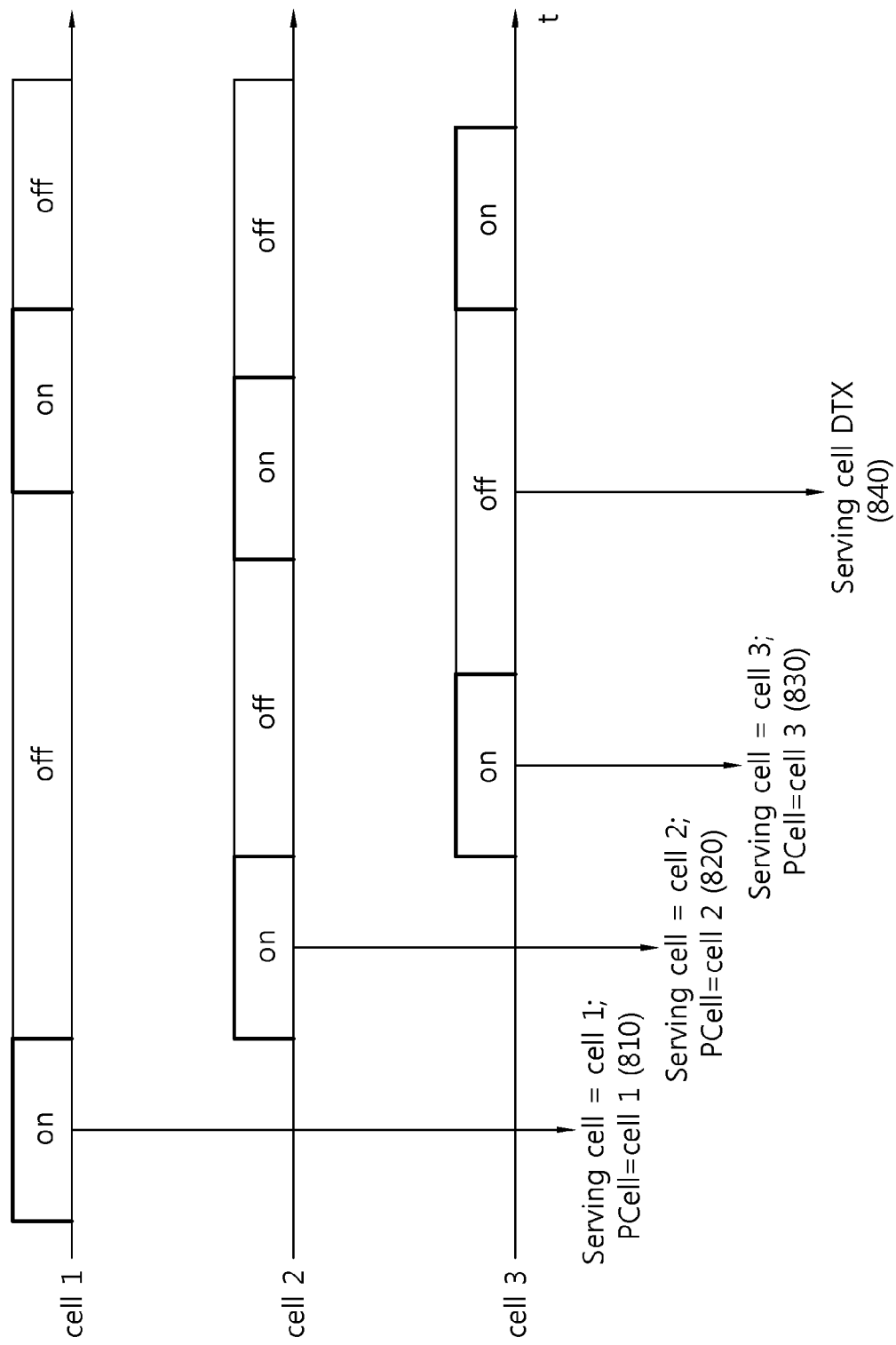
FIG. 8 shows an exemplary concept for cell switch according to an exemplary embodiment of the present invention.

FIG. 8 shows an exemplary concept for cell switch according to an exemplary embodiment of the present invention.

Referring to FIG. 8, a cluster consists of Cell 1, Cell 2 and Cell 3 where each cell repeats on/off cycle. Assuming a tightly synchronized network among cells, it can be assumed that a CoMP set (Cell 1, Cell 2, and Cell 3) is configured to a UE and a set of CSI-RS configurations/resources is configured to the UE (or PQI configurations) where a CSI-RS configuration/resource is mapped to a cell or TP. To indicate whether each cell is on or off mode, this invention proposes to activate/deactivate CSI-Rs process/resource.

Based on CoMP technique, it is assumed that each CSI process consist of a CSI-RS resource and zero or one or potentially multiple IMR(s) where IMR is used to estimate CSI on cells except for the cell associated with CSI-RS resource within the cluster or interference of the cells.

For example, Cell 1 uses CSI-RS configuration index 0 with 5 msec periodicity, Cell 2 uses CSI-RS configuration index 1 with 5 msec and Cell 3 uses CSI-RS configuration index 2 with 5 msec periodicity and then the first CSI process consists of CSI-RS conf #0 with IMR={CSI-RS conf#1, CSI-RS conf#2}, second CSI process consists of CSI-RS conf #1 with IMR={CSI-RS conf#1} and third CSI process consists of CSI-RS conf #2 with IMR={CSI-RS conf#1}. Each CSI process can be mapped to a cell within a cluster. When a CSI process is configured to a UE, by default, it can be assumed to be deactivated or activated.

Figure 9:
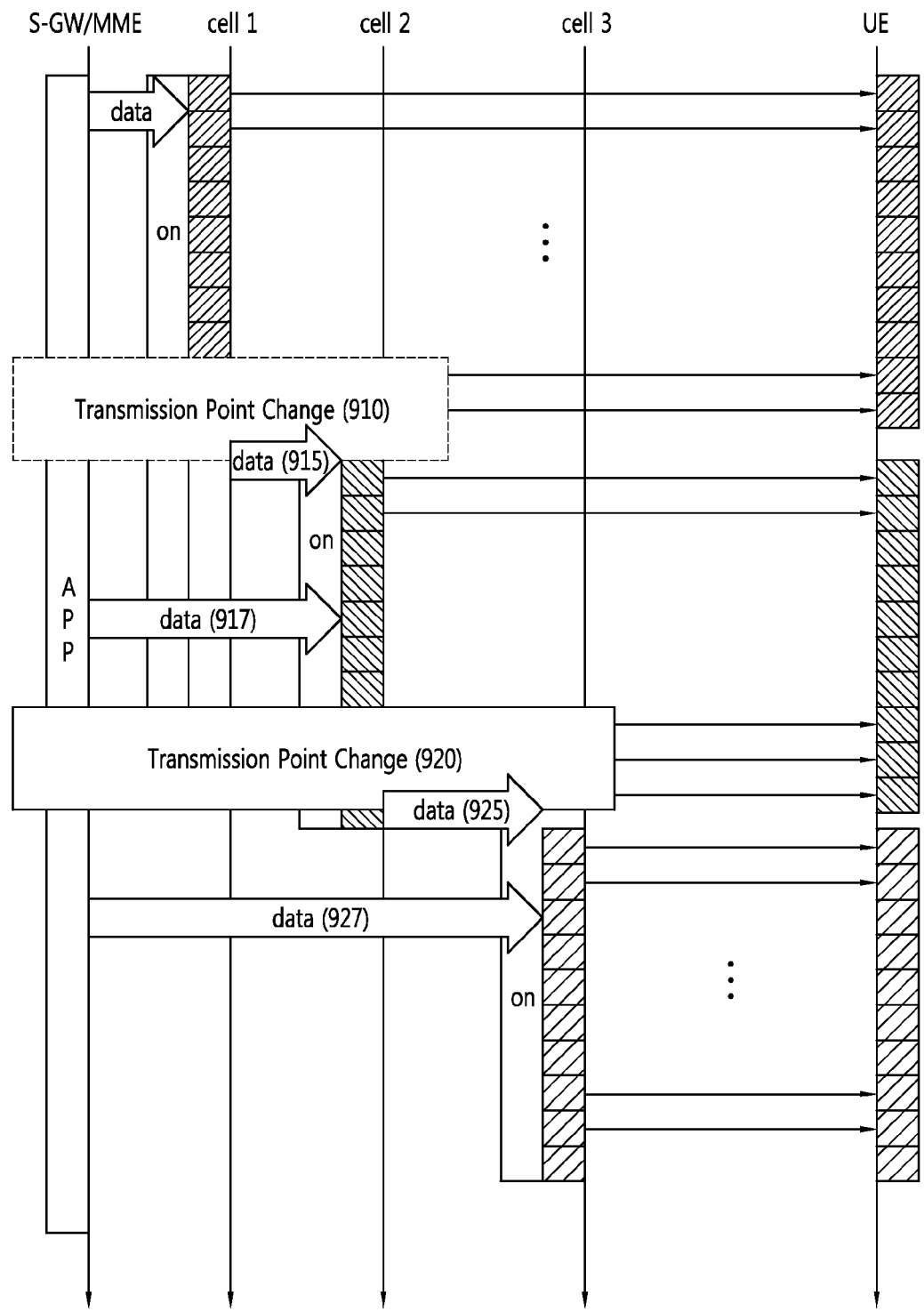
FIG. 9 shows an exemplary concept for active transmission point switch according to an exemplary embodiment of the present invention.

FIG. 9 shows an exemplary concept for active transmission point switch according to an exemplary embodiment of the present invention.

Referring to FIG. 9, this invention shows an example of CSI-RS resource or CSI process activation/deactivation to change an active transmission point without changing the serving cell. When Cell 1 is a serving cell and the Cell 1 is about to off, it initiates the process of changing PCell which is active transmission point from Cell 1 to Cell 2 by transferring buffer status and the data in the buffer (910). Alternatively, as previous example, Cell 2 may have received data from serving gateway such that Cell 1 only needs to transfer the buffer status so that Cell 2 can resume data transmission. Herein the buffer status information may be transmitted by the UE (915, 917).

When transfer is finished, Cell 1 activates Cell 2 CSI process (or CSI-RS resource or PQI configuration) and deactivates Cell 1's CSI process or CSI-RS resource or PQI configuration. The similar procedure occurs when Cell 2 turns off and switches the active TP to Cell 3. This is based on the assumption that UE does not require major RRC reconfiguration or RRC reconnection when a switch between cells within a cluster occurs.

More details, this invention provides that CSI-RS Activation/Deactivation as followings. The CSI process or CSI-RS resource or the associated PQI configuration activation includes that (1) Activated by another cell: a CSI process may be activated by another cell, (2) Activated by reading discovery signal: when a UE has identified a cell by reading discovery signals or a signal which is transmitted when cell wakes up or reading synchronization signals each is active, it may activate the associated CSI process, and (3) Activated according to the predetermined or higher-layer signaled on/off schedule of a cell: a UE may be configured or pre-configured with information of cell on/off schedule. If that is given, a UE may activate/deactivate the cell according to the given scheduled.

Otherwise, CSI process or CSI-RS resource or the associated PQI configuration deactivation includes that (1) Deactivated by another cell: a CSI process may be deactivated by another cell, (2) Deactivated by not receiving any signal from a cell for the threshold time: similar to carrier deactivation, if UE does not receive any data from a cell, it may deactivate the associated CSI process unless it is the only one CSI process activated at the time, and (3) Deactivated according to the predetermined or higher-layer signaled on/off schedule of a cell: a UE may be configured or pre-configured with information of cell on/off schedule. If that is given, a UE may activate/deactivate the cell according to the given scheduled.

When a UE is configured with a set of CSI process, each CSI process is associated with a CSI process index. The UE may assume that CSI process index=0 (or a default value) is allocated to the serving cell which is a RRC connected cell. When the CSI process for the serving cell is deactivated, the CSI process with the lowest index would become a serving cell. Whenever a CSI process is activated or deactivated, the UE shall reset RLM related status/timer. When a new cell becomes the serving cell, UE shall perform related RLM on the new serving cell. For each activated CSI process, UE may perform RLM in parallel. When a UE detects Radio Link failure, it may deactivate the associated CSI process. If there is no activated CSI process and UE is not configured with any eNB DTX cycle, it may trigger RLM failure for hand-over procedure. That is, this invention show that the UE experiences the RLM failure, a cell of the RLM can be deactivated the associated CSI process.

Therefore, the UE behavior when a CSI process or CSI-RS resource or the associated PQI configuration is deactivated follows. If a UE is configured with a periodic CSI report on the CSI-RS process/resource which is deactivated, UE shall not send a report on the CSI-RS process/resource. If a UE is requested to transmit aperiodic CSI report where the set of triggered CSI processes includes the deactivated CSI process, UE shall transmit CSI reports on the rest CSI processes excluding the deactivated CSI process.

It is assumed that TM10 (or like new TM) is configured to the UE if multiple CSI processes are configured. When multiple CSI processes are configured with TM9, UE shall assume that only one CSI process will be activated at one time. In other words, UE shall not transmit more than one CSI reports at one time. In terms of reporting uplink for CSI, the UE may use the configured uplink per each CSI-RS resource parameter set (e.g., PQI entry) to transmit CSI report on a cell. Alternatively, a UE may be configured to transmit aggregated CSI to the serving cell.

If the number of configured CSI processes is larger than the number of CSI processes that UE can support, UE shall assume that only the number of CSI processes that UE can support can be activated at one time. If UE can support 3 CSI processes and is configured with 5 CSI processes, UE shall assume only three (3) CSI processes would be activated at one time. If there are more than three CSI processes are activated at one time, UE shall assume the first three CSI processes and disregard the rest based on CSI index. A UE shall assume no ePDCCH/PDSCH from the deactivated transmission point where the associated CSI-process is deactivated.

When CSI process is reactivated from deactivated state, UE shall restart CSI measurement, which includes that the UE flushes out the measurement history on the same process if applicable. When CSI process is deactivated, UE may flush out HARQ buffer or not. In other words, the deactivation behavior of a CSI process would be similar to the behavior of SCell deactivation in LTE Rel-10/11 specification. When a CSI process is deactivated, UE may assume that the associated tracking RS, CRS, or discovery signal will not be transmitted from the associated transmission point. The associated tracking RS, CRS, or discovery signal may be identified as to TRS, CRS, or discovery signal which is quasi-collocated (QCL) with the CSI-RS.

This invention includes that a CSI process can be deactivated by either explicit signaling such as MAC CE or implicitly ways such as via on/off cycling indication or via DTX of eNB/TP or pre-determined pattern or cell-specific signaling from each transmission point or cell. Also, if there is a discovery signal transmitted when CSI process is deactivated, the UE may assume that minimum CSI measurement can be performed on the discovery signal.

Additionally, instead of activation/deactivation of CSI process, there are a couple of different approaches to address the cell on/off as following.

This invention includes CSI-RS re-configuration with on/off period. Another approach is to configure each CSI-RS with on/off period if the cell has pre-known on/off cycle. When CSI-RS is off period, the behavior is same as to be deactivated CSI-RS in the above approach. This invention includes CSI-RS transmission in off mode. Another approach is to allow transmission of CSI-RS regardless of on/off mode so that the UE can measure the cell regardless of cell's on/off. Furthermore, if the cell has "on", "dormant" and "off" mode where "dormant" mode indicates that the eNB transmits necessary signals only in that mode, the UE may expect to receive CSI-RS in "on" and "dormant" mode. When eNB is in "dormant" mode, the UE may maintain RRC_Connected mode while it performs time/tracking performance based on CSI-RS and performs RRM based on CSI-RS.

This invention includes that a simple mechanism of CSI on/off can be supported per each CSI process or CSI-RS resource or PQI configuration, each PQI entry is associated with a CSI-RS resource. When CSI process is "on" the UE is expected to transmit CSI reports associated with the process and when it is "off", UE is not expected to report the CSI on the process. To reduce reconfiguration overhead, it is expected to use MAC CE to enable/disable or activate/deactivate CSI process. Also, it is noted that turning on/off of a cell can be used for on/off of CSI process when a UE is configured with TM10 or new TM (or similar TM where a UE is configured with a set of quasi-collocated antenna information). For example, a CSI process is QCL with a cell (by the QCL configuration indicated by cell ID) where UE is informed that the associated cell has been turned off, and then the UE shall assume the associated CSI process is "off" as well. When the linked cell is on, the reverse function for CSI process (i.e., on mode for CSI process) is expected. By this way, the UE may not have to be reconfigured with a set of CSI-RS resources whenever the linked cells/TPs are changing their operation modes i.e., from on to off or vice versa.

Further, this invention includes that the proposed techniques are applicable to the case where each PQI entry is mapped to a TP or a small cell where each PQI entry includes one non-zero-power CSI-RS resource which is used as a unit to differentiate different small cell in the cluster.

Figure 10:
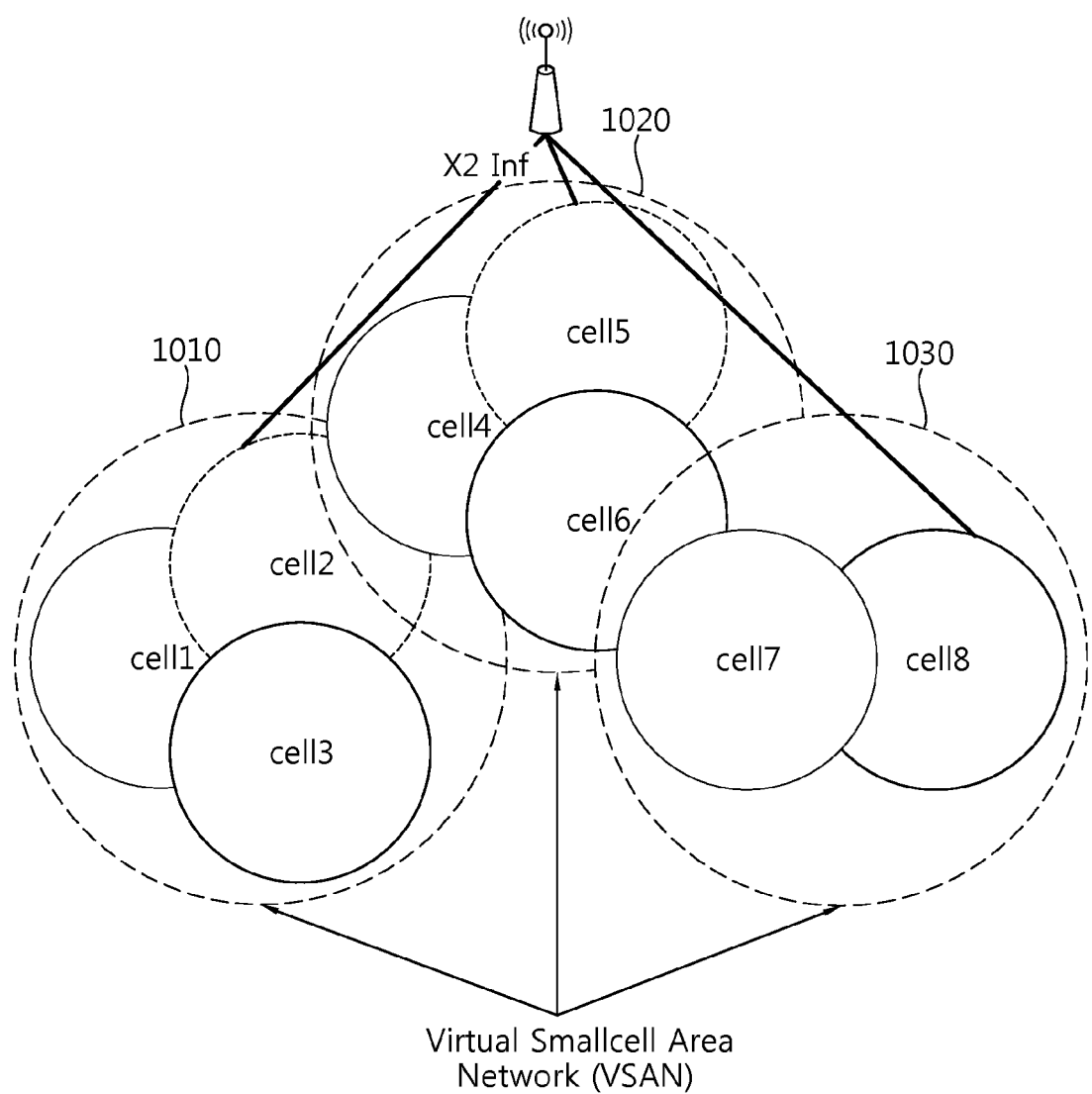
FIG. 10 shows an exemplary concept for a virtual small cell area network according to an exemplary embodiment of the present invention.

FIG. 10 shows an exemplary concept for a virtual small cell area network according to an exemplary embodiment of the present invention.

Referring to FIG. 10, a small cell cluster is utilized to mimic a virtual LAN concept such that a set of small cells forms a cluster where each cluster is called as virtual small cell area network. The characteristics of a virtual small cell area network (VSAN) are defined as following. Each small cell within a VSAN communicates each other to support a UE. It is a broadcast domain such that when a UE transmit an uplink data, it can be received by all small cells within a VSAN and also small cells can perform single frequency network (SFN) based downlink transmission to enhance the reception quality at the UE side. Among different VSAN, either by orthogonal code or different frequency or different time or etc, communication can be partitioned so that each VSAN does not interfere neighboring VSAN.

In terms of data communication between small cell within a VSAN and MME and/or serving GW is not per small cell rather one virtual connection per each VSAN.

For a convenience to explain, a representative cell can be called as cluster head or master small cell. If a small cell has a backhaul to macro eNB, it would be better to choose that small cell as a master. As cells within a VSAN collaborate to serve UEs each other, real-time and interactive communications among small cells are needed. There is dedicated frequency approach in this invention, frequency used for small cell communications would be separated from frequency used for data transmission for UEs. Or shared frequency approach is used; one frequency is shared among small cells and between small cell and UEs. Lastly, macro-assisted air-interface based approach can be used for this invention.

This invention further proposes that inter-cell communication coordination. A wireless backhaul (i.e., no point-to-point link between a small cell and a macro cell or between small cells) is assumed, there are possibly a few mechanisms to discover each other and communicate with each other. A CSMA (Carrier Sense Multiple Access)-like collision avoidance based communication is one way, this approach is to utilize CSMA method to discover and communicate among eNBs. The main drawback of this approach is that this requires a dedicated resource used for eNB backhaul communication. This approach may require a new inter-eNB interface. Or, Relay-based approach can be another way, another approach is to utilize relay techniques (i.e., the scheduling based approach where the scheduling is done by a master node) where an eNB becomes the master nodeB and others become relay-type eNB. It may require additional off-line discovery mechanism to discover each other. Using this approach, a macro cell or a cluster head may become the master and other small cells behave as if relay nodes. Or a slotted-CSMA can be used to share the communication resource between eNBs and between eNBs/UEs.

Figure 11:
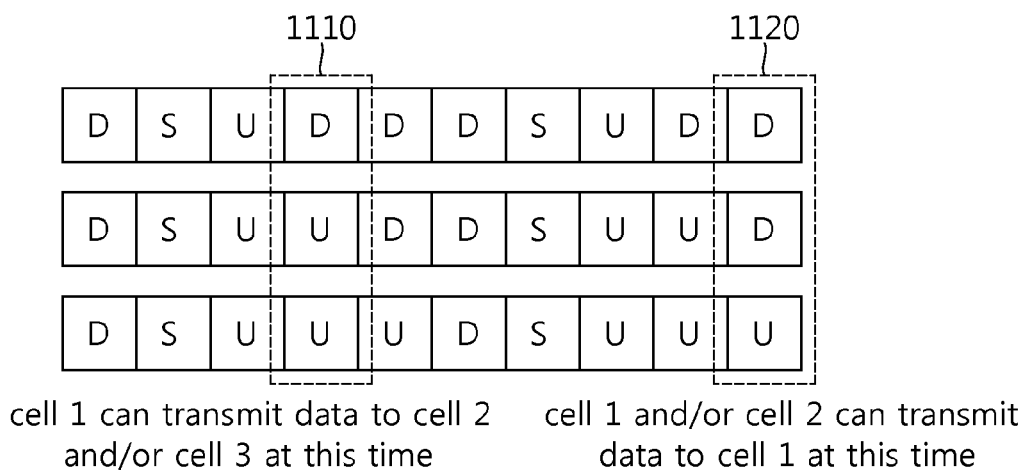
FIG. 11 shows an exemplary concept for different TDD Configuration according to an exemplary embodiment of the present invention.

Meanwhile, this invention provides that different TDD/Dynamic TDD based coordination. FIG. 11 shows an exemplary concept for different TDD Configuration according to an exemplary embodiment of the present invention.

Referring to FIG. 11, a small cell operates in a TDD band or utilizes down or up link FDD band as to a single TDD band, each small cell eNB can behave as an eNB as well as an UE is served by another small cell for data exchange among small cells.

To effectively coordinate communications among small cells and between small cell and UEs, this invention proposes to deploy a different TDD configuration or a dynamic TDD configuration per each small cell which will be broadcasted in either PBCH or SIB. This scheme can be applied to either VSAN or flat small cell network.

For example, Cell 1, Cell 2 and Cell 3 may collaborate each other, each cell is configured with different TDD configuration as shown, and then at 3rd subframe, since Cell 1 is Downlink and Cell 2 and Cell 3 are Uplink, Cell 1 can transmit some data to Cell 2 and/or Cell 3 (1110). At 9rd subframe, Cell 1 and Cell 2 are Downlink and Cell 3 are Uplink, Cell 2 and Cell 2 can transmit data to Cell 3 (1120).

In terms of resource that each cell uses, it can be either based on dynamic scheduling which is scheduled by the intended cell or based on pre-determined/reserved resource. To support this, each small cell shall be able to discover other neighboring small cells. To identify neighboring small cells, at least two signals/channels should be received synchronization signal and system information. To be able to support hearing of each other s synchronization signal and system information, transmission timing of synchronization signal and system information would be better coordinated either by frequency division or time division mechanism.

For example, based on cell ID, each cell transmits its synchronization signal and following system information in different frequency or each cell transmits its synchronization signal and the following system information in different time frame (i.e., subframe). If time division mechanism is used, considering that TDD configurations have a limited number of downlinks, it would be desirable to increase the interval between two consecutive system information or discovery channel so that multiple small cells can be coordinated. For example, instead of transmitting MIB every 10 msec, it can be changed to 20 msec interval where each cell transmits MIB at different subframe with an offset. Or, each small cell and UE may assume that discovery signal and system information comes in the same subframe where multiplexing of multiple small cells can be handled by different offset and period for discovery signal.

This invention assumes that each small cell is able to successfully receive other cells system information and synchronization signal. If scheduling based coordination for communication among small cells is used, each eNB assigns a C-RNTI to each small cell and delivers the list of C-RNTIs for neighbor small cells via broadcast or multicast or unicast. The eNB may assign a RNTI for the group used in VSAN instead of individual RNTI as well. A list of cells that a UE has identified can be sent to a small cell which can be used for neighboring cell information as well in thin invention.

Actual data communication among small cells may use X2 interface protocol or a new interface protocol which simplify the design of communication of both control and data among small cells.

In terms of PHY layer aspect, the communication among small cells is different from data exchange between UE and small cell in the following aspects. HARQ process may be not used, in other words, retransmission at PHY layer may not be supported. Data modulation may be based on either BPSK, QPSK or 16QAM. Adaptive Modulation Control (ACS) may not be used for data transmission. MU-MIMO can be supported, yet SU-MIMO would not be supported. SPS can be configured in both uplink and downlink where a small cell may be configured with multiple SPS. Yet, a small cell can configure at most one SPS to another small cell. Upon configuration, if configured resources are colliding, collision resolution would be initiated to resolve the conflict. No retransmission of SPS PDSCH or PUSCH is used. Periodic CSI report is not supported. Aperiodic CSI may be used for interference and channel estimation purpose.

Overall, the benefits of configuring a different TDD configuration among neighbor cells compared to using a predetermined time division, e.g., use subframe 4 and 5 per radio frame for eNB communication is to allow the flexibility where coordination of TDD configuration among small cells may not be easily achievable. Moreover, if we consider half-duplex small cell, different configuration would allow data communication among small cells. Note that all uplink subframes may be usable for eNB communication for network synchronization or small cell discovery among cells similar to D2D. When a subframe where different configurations have a conflict between uplink and downlink, eNB may use well-balanced power/resource not to interfere other on-going UE uplink transmissions. Another benefit is UE transparency where UE is not impacted by eNB communication except for potentially lower throughput due to resource sharing.

Lastly, different TDD configuration among small cells within a cluster is explained more. When a set of cells are collaborating each other to serve a UE within a small cell cluster, if different TDD configuration is used per cell and HARQ-ACK is configured to be transmitted via the serving cell or a CC, it is necessary to indicate reference TDD configuration that UE shall assume for downlink and uplink, particularly for HARQ-ACK timing. A few approaches are feasible as below. A new configuration with a new HARQ-ACK timing can be sent. For example, a new configuration would include a set of downlink unions of small cells and a set of uplink union of small cells.

For example as in FIG. 11, {D, S, U, X, X, D, S, U, X, X} where X indicates an invalid (neither of downlink or uplink), and D indicates downlink, and U indicates uplink. A new HARQ-ACK timing table shall be defined. For PDSCH HARQ timing, a reference configuration would be TDD configuration 2 with two uplinks. For PUSCH HARQ timing, a reference configuration would be TDD configuration 0. In other words, a reference for PDSCH HARQ timing for a new configuration is a TDD configuration where the set of uplinks of the reference configuration is a subset of uplinks in the new configuration. If there are multiple candidates of reference configurations, the configuration with the maximum number of uplinks will be selected. For PUSCH HARQ timing, a similar rule applies for downlink subframes including special subframes. It is worthwhile to mention that a new timing table can be constructed (as there is no referable HARQ-ACK timing table is present or to maximize the utilization of uplink/downlink subframes) which can be sent by the eNB. Or, a pair of reference configurations for downlink and uplink respectively is sent. For instance, in FIG. 11, {Conf#0, Conf#2} can be signaled where downlink reference can be used for PUSCH HARQ timing and downlink data transmission and uplink reference can be used for PDSCH HARQ timing and uplink transmission. Further, the UE computes reference carriers based on configurations of configured cells. Or the UE may assume that a subframe is uplink subframe when conflict occurs. For example in FIG. 11, the UE assumes that subframe 4, 5, 9 and 10 would be uplink subframes. Or, the UE may assume those conflicting subframes as downlink subframes.

Figure 12:
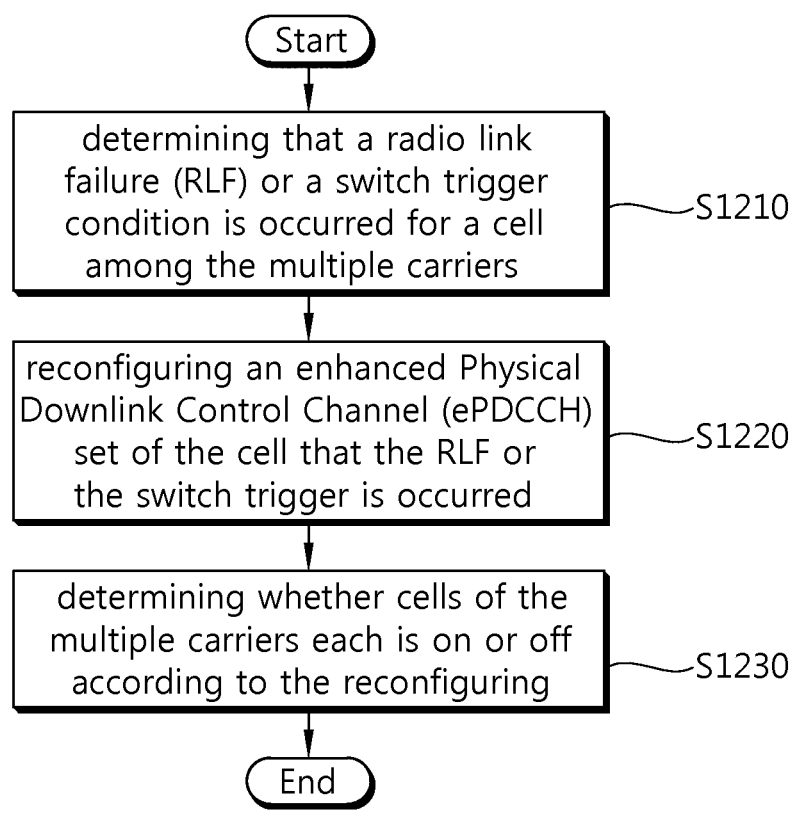
FIG. 12 shows an example of a flow chart for determining cell on/off according to an exemplary embodiment of the present invention.

FIG. 12 shows an example of a flow chart for determining cell on/off according to an exemplary embodiment of the present invention.

Referring to FIG. 12, the UE may determine that a radio link failure (RLF) or a switch trigger condition is occurred for a cell among the multiple carriers, herein the multiple carriers each is set to a cell each. For example, three small cells for a cluster may be existed as CC1, CC2, and CC3, and then two ePDCCH sets may be mapped to at least two small cells respectively (1210). After detection of RLF, the UE reconfigures ePDCCH set of the cell that the RLF or the switch trigger is occurred. The ePDCCH set may dynamically be changed and the small cell as serving cell may transmit data by ePDCCH set or using PQI or CSI-RS resource mapped to the ePDCCH set, the data assigned application data may come from the same or different serving cell by scheduling serving gateway/MME (1220). The UE determines whether cells of the multiple carriers each is on or off according to the reconfiguring (1230). Herein the cell on/off or CSI-RS activation/deactivation for cells each may predetermined as different start timing and different period corresponding to each cell or TP. Or the cell on/off or CSI-RS activation/deactivation for cells each is signaled by the MAC or RRC signal, or cell-specific signaling.

Figure 13:
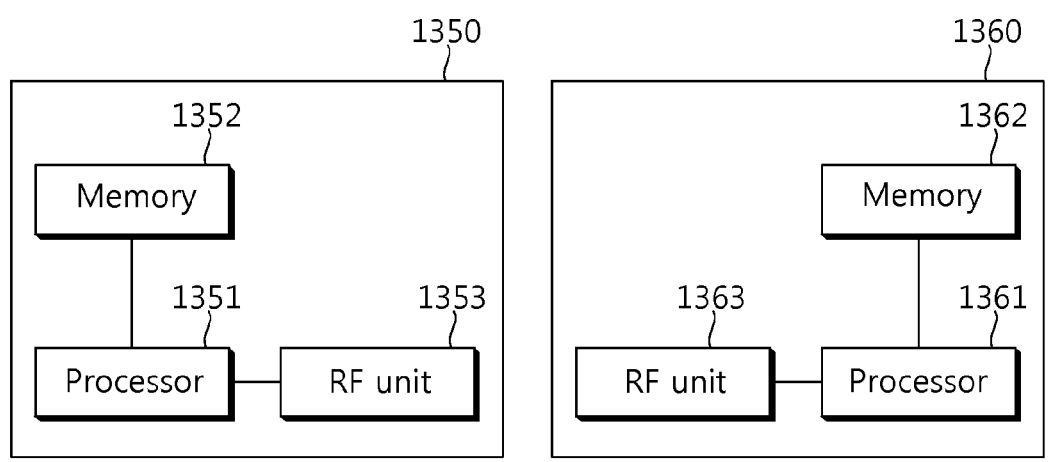
FIG. 13 shows a block diagram showing a wireless communication system according to an exemplary embodiment of the present invention.

FIG. 13 is a block diagram showing a wireless communication system according to an embodiment of the present invention.

Referring to FIG. 13, a BS 1350 includes a processor 1351, a memory 1052, and a radio frequency (RF) unit 1353. The memory 1352 is coupled to the processor 1351, and stores a variety of information for driving the processor 1351. The RF unit 1353 is coupled to the processor 1351, and transmits and/or receives a radio signal. The processor 1351 implements the proposed functions, procedures, and/or methods. In the embodiments of FIG. 2 to FIG. 10, the operation of the BS can be implemented by the processor 1351.

More details, the processor 1351 may configure one or more sets of the ePDCCH multiplexed with PDSCH by signaling from a higher-layer signal as Semi-persistent Scheduling (SPS) to lower scheduling complexity and control message overhead. The eNB may configure MBSFN subframes in a new carrier. Also, the processor 1351 may configure a transmission mode and antenna port for RSs based on a corresponding transmission mode. Furthermore, the processor 1351 may configure a DCI format of a UE to configure a transmission mode, the DCI includes a number of PRBs used for the ePDCCH which is allocated with PDSCH PRBs of a resource allocation by a Downlink Control Information (DCI), a number of PRBs overlapped between the PDSCH PRBs and the ePDCCH PRBs by the DCI, or a number of PRBs between the PDSCH PRBs and the ePDCCH PRBs are localized or distributed to a corresponding UE.

Especially, the eNB may configure CSI-RS reconfiguration for the ePDCCH sets, or one of the ePDCCH sets since the RLF or the switch trigger of a serving cell is occurred. The CSI-RS reconfiguration is associated with a Cell ID of Transmission Point, or at least one of CSI-RS resource or CSI process or a cell associated with a new PQI for the ePDCCH set corresponding to small cell in a cluster.

The eNB may configure CSI-RS activation/deactivation for cells each with predetermined patterns as different start timing and different period corresponding to each cell or TP. Or the CSI-RS activation/deactivation for cells each is signaled by the MAC or RRC signal, or cell-specific signaling to indicated cell on/off. So the eNB may configure or compose corresponding signal to indicate the CSI-RS activation/deactivation or cell on/off to UE. When a serving cell is occurred a RLF of cell switch during data transmission, new serving cell can also transmit data consecutively after last successful transmission of a previous serving cell to recover data of RLF serving cell using the reconfigured ePDCCH set or CSI-RS reconfiguration associated with a new PQI to the ePDCCH set.

Wireless device 1360 includes a processor 1361, a memory 1362, and an RF unit 1363. The memory 1362 is coupled to the processor 1361, and stores a variety of information for driving the processor 1361. The RF unit 1363 is coupled to the processor 1361, and transmits and/or receives a radio signal. The processor 1361 implements the proposed functions, procedures, and/or methods. In the embodiments of the FIG. 2 to FIG. 10, the operation of the UE can be implemented by the processor 1361.

More details, the processor 1361 may receive a RRC signal including one or more sets of the ePDCCH multiplexed with PDSCH by signaling from a higher-layer signal as Semi-persistent Scheduling (SPS) or a DCI via PDCCH or ePDCCH. That is, the processor 1361 determines a starting OFDM symbol of a physical downlink shared chancel (PDSCH) which is variably located by presence of reference signal (RS), determines a number of physical resource block (PRB)s used for an enhanced physical downlink control channel (ePDCCH), and determines the ePDCCH, wherein the ePDCCH is set by one or more sets of PRBs within the PDSCH configured to a UE to monitor the ePDCCHs. The processor 1361 may configure MBSFN subframes in a new carrier. Also, the processor 1361 may configure a transmission mode and antenna port for RSs based on a corresponding transmission mode. Furthermore, the processor 1361 may receive and configure a DCI format of a transmission mode, the DCI includes a number of PRBs used for the ePDCCH which is allocated with PDSCH PRBs of a resource allocation by a Downlink Control Information (DCI), a number of PRBs overlapped between the PDSCH PRBs and the ePDCCH PRBs by the DCI, or a number of PRBs between the PDSCH PRBs and the ePDCCH PRBs are localized or distributed to a corresponding UE.

Especially, the processor 1361 may configure CSI-RS reconfiguration for the ePDCCH sets, or one of the ePDCCH sets since the RLF or the switch trigger of a serving cell is occurred. The CSI-RS reconfiguration is associated with a Cell ID of Transmission Point, or at least one of CSI-RS resource or CSI process or a cell associated with a new PQI for the ePDCCH set corresponding to small cell in a cluster. The processor 1361 may configure CSI-RS activation/deactivation for cells each with predetermined patterns as different start timing and different period corresponding to each cell or TP. Or the CSI-RS activation/deactivation for cells each is signaled by the MAC or RRC signal, or cell-specific signaling to indicated cell on/off. So the processor 1361 may determine the CSI-RS activation/deactivation or cell on/off in small cells each of clusters. When a RLF of cell switch of one serving cell among cells during data reception is detected, the processor 1361 may configure CSI-RS reconfiguration for the ePDCCH sets or at least one of ePDCCH sets and also receive data consecutively via new serving cell. The data is followed after last successful transmission of a previous serving cell to recover data of RLF serving cell using the reconfigured ePDCCH set or CSI-RS reconfiguration associated with a new PQI to the ePDCCH set.

Also, the processor 1361 may determine whether cells of the multiple carriers each is configured with different TDD configuration or a dynamic TDD configuration, determining whether timing of the cells each to transmit or receive data and control based on the different TDD configuration or the dynamic TDD configuration for the cells each, and determining to receive or transmit response signals each based on the configurations each of corresponding to the cells each. wherein the multiple carriers each is set with difference frequencies each and the timings are set for HARQ(Hybrid Automatic Repeat reQuest) process.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting and receiving data in a wireless communication system supporting multiple carriers, performed by a wireless device, the method comprising:
    determining whether a radio link failure (RLF) or a switch trigger condition has occurred for a serving cell among the multiple carriers,
    wherein each of the multiple carriers is set to each cell, and
    when the RLF or the switch trigger condition has occurred for the serving cell
        reconfiguring an enhanced Physical Downlink Control Channel (ePDCCH) set of the cell,
        determining whether cells for each of the multiple carriers is on or off according to the reconfiguring, and
        receiving data consecutively after a last successful transmission of the serving cell to recover data of the serving cell from a new serving cell.

2. The method of claim 1, the determining cell on/off further comprising:
    determining whether a channel state information reference signal (CSI-RS) resource for the ePDCCH set is activated or deactivated,
    wherein the CSI-RS is associated with a Cell identification (ID) of a Transmission Point.

3. The method of claim 1, the determining cell on/off further comprising:
    determining whether at least one of a CSI-RS resource or a CSI process or a cell associated with a PQI (PDSCH RE mapping and Quasi-collocated Indicator) index is activated or deactivated.

4. The method of claim 1, the reconfiguring further comprising:
    mapping the ePDCCH set to a new cell to change a serving cell among cells of the multiple carriers, and
    activating at least one of a CSI-RS resource or a CSI process or a cell associated with a new PQI (PDSCH RE mapping and Quasi-collocated Indicator) for the ePDCCH set.

5. The method of claim 1, the determining cell on/off further comprising:
    receiving a Media Access Control (MAC) signal, and
    determining whether a cell to be mapped the ePDCCH set is activated or deactivated by the MAC signal.

6. The method of claim 1, the determining cell on/off further comprising:
    determining that a CSI-RS configuration for each cell is configured with an index having different start time and on/off period assigned based on a Cell identification (ID) of a Transmission Point.

7. The method of claim 1, the determining cell on/off further comprising:
    reading discovery signals or synchronization signals,
    determining that one of the discovery signals or synchronization signals is active, and
    activating at least one of a CSI-RS resource or a CSI process or a cell of the active signal.

8. The method of claim 1, further comprising:
    initiating a hand-over procedure to change a serving cell,
    deactivating at least one of a CSI-RS resource or a CSI process or a cell not receiving downlink data, and
    determining not to send a CSI-RS report corresponding to a corresponding cell when said at least one of the CSI-RS resource or the CSI process or the cell is deactivated.

9. A method for transmitting and receiving data in a wireless communication system supporting multiple carriers, performed by a wireless device, the method comprising:
    determining whether cells of the multiple carriers are each configured with a different TDD configuration or a dynamic TDD configuration,
    determining a timing of each of the cells to transmit or receive data based on the different TDD configuration or the dynamic TDD configuration, and
    determining to receive or transmit response signals each based on the different TDD configuration or the dynamic TDD configuration
    wherein each of the multiple carriers is set with difference frequencies and timings for a HARQ (Hybrid Automatic Repeat reQuest) process.

10. A wireless device for transmitting and receiving data in a wireless communication system supporting multiple carriers, comprising:
    a radio frequency unit for receiving a radio signal; and
    a processor, operatively coupled with the radio frequency unit, configured to:
    determine whether a radio link failure (RLF) or a switch trigger condition has occurred for a serving cell among the multiple carriers,
    wherein each of the multiple carriers is set to each cell, and
    when the RLF or the switch trigger condition has occurred for the serving cell:
        reconfigure an enhanced Physical Downlink Control Channel (ePDCCH) set of the cell,
        determine whether cells for each of the multiple carriers is on or off according to the reconfiguring, and
        receive data consecutively after a last successful transmission of the serving cell to recover data of the serving cell from a new serving cell.

11. The wireless device of claim 10, wherein the processor is configured to:
    determine whether a channel state information reference signal (CSI-RS) resource for the ePDCCH set is activated or deactivated, wherein the CSI-RS is associated with a Cell identification(ID) of a Transmission Point, or
    determine whether at least one of a CSI-RS resource or a CSI process or a cell associated with a PQI (PDSCH RE mapping and Quasi-collocated Indicator) index is activated or deactivated.

12. The wireless device of claim 10, wherein the processor is configured to:

receive a Media Access Control (MAC) signal, and determine whether a cell to be mapped the ePDCCH set is activated or deactivated by the MAC signal, or determine that a CSI-RS configuration for each cell is configured with an index having different start time and on/off period assigned based on a Cell identification (ID) of a Transmission Point, or read discovery signals or synchronization signals, determine that one of the discovery signals or synchronization signals is active, and activate at least one of a CSI-RS resource or a CSI process or a cell of the active signal.

13. The wireless device of claim 10, wherein the processor is configured to:

initiate a hand-over procedure to change a serving cell, deactivate at least one of a CSI-RS resource or a CSI process or a cell not receiving downlink data, and determine not to send a CSI-RS report corresponding to a corresponding cell when said at least one of the CSI-RS resource or the CSI process or the cell is deactivated.

* * * * *